US010664646B2

(12) United States Patent
Li

(10) Patent No.: US 10,664,646 B2
(45) Date of Patent: May 26, 2020

(54) METHODS AND DEVICES FOR USING ONE TERMINAL TO CONTROL A MULTIMEDIA APPLICATION EXECUTED ON ANOTHER TERMINAL

(71) Applicant: TENCENT TECHNOLOGY (SHENZHEN) COMPANY LIMITED, Shenzhen (CN)

(72) Inventor: Lie Qiang Li, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 15/810,564

(22) Filed: Nov. 13, 2017

(65) Prior Publication Data
US 2018/0067904 A1 Mar. 8, 2018

Related U.S. Application Data

(63) Continuation of application No. 14/099,826, filed on Dec. 6, 2013, now Pat. No. 9,846,685, which is a
(Continued)

(30) Foreign Application Priority Data

Aug. 29, 2012 (CN) .......................... 2012 1 0311632

(51) Int. Cl.
*G06F 40/12* (2020.01)
*G11B 27/10* (2006.01)
(Continued)

(52) U.S. Cl.
CPC .............. *G06F 40/12* (2020.01); *G11B 27/10* (2013.01); *H04N 21/242* (2013.01); *H04N 21/4307* (2013.01)

(58) Field of Classification Search
CPC ............................... G06F 17/21; G06F 17/211
(Continued)

(56) References Cited

U.S. PATENT DOCUMENTS 5,617,539 A 4/1997 Ludwig et al.
5,861,883 A 1/1999 Cuomo et al.
(Continued)

FOREIGN PATENT DOCUMENTS

CN 101309143 A 11/2008
CN 101639973 A 2/2010
(Continued)

OTHER PUBLICATIONS

Berners-Lee et al.; Hypertext Transfer Protocol—HTTP/1.0; Request for Comment 1945; May 1996; Internet Engineering Task Force; pp. 1-60.
(Continued)

*Primary Examiner* — Andrew R Dyer
(74) *Attorney, Agent, or Firm* — Anova Law Group, PLLC

(57) ABSTRACT

Methods and devices for terminal control are provided. The method comprises: sending a request from a first terminal to a server to obtain information about a multimedia application currently running on a second terminal, the information comprising application identification and one or more playback attributes of the multimedia application; displaying on the first terminal the information about the multimedia application currently running on the second terminal; generating by the first terminal one or more new playback attributes of the currently running multimedia application, and sending from the first terminal to the second terminal via the server a control request comprising the one or more new playback attributes, thereby allowing the second terminal to control the multimedia playback of the multimedia applica-
(Continued)

tion based on the one or more new playback attributes in the control request.

20 Claims, 16 Drawing Sheets

Related U.S. Application Data continuation of application No. PCT/CN2013/077791, filed on Jun. 24, 2013.

(51) Int. Cl.
*H04N 21/242* (2011.01)
*H04N 21/43* (2011.01)

(58) Field of Classification Search
USPC .................................................. 715/201, 203
See application file for complete search history.

(56) References Cited

U.S. PATENT DOCUMENTS

| | | | |
|---|---|---|---|
| 5,944,791 A | 8/1999 | Scherpbier | |
| 6,085,247 A | 7/2000 | Parsons, Jr. et al. | |
| 6,148,328 A * | 11/2000 | Cuomo | H04L 12/1822 370/260 |
| 6,321,252 B1 | 11/2001 | Bhola et al. | |
| 6,594,773 B1 | 7/2003 | Lisitsa et al. | |
| 7,056,217 B1 * | 6/2006 | Pelkey | A63F 13/12 463/25 |
| 7,346,698 B2 | 3/2008 | Hannaway | |
| 7,532,196 B2 | 5/2009 | Hinckley | |
| 7,571,014 B1 | 8/2009 | Lambourne et al. | |
| 7,627,808 B2 | 12/2009 | Blank et al. | |
| 7,716,376 B1 * | 5/2010 | Price | G06F 1/12 709/248 |
| 7,777,693 B2 | 8/2010 | Ohuchi | |
| 7,908,219 B2 * | 3/2011 | Abanami | G06F 21/10 705/59 |
| 8,050,987 B2 * | 11/2011 | Liu | G06Q 10/00 705/14.4 |
| 8,396,932 B2 * | 3/2013 | Pattekar | G06Q 10/10 709/206 |
| 8,436,786 B2 | 5/2013 | Kamoto | |
| 8,448,073 B2 | 5/2013 | Nimon et al. | |
| 8,554,842 B2 * | 10/2013 | Maehiro | A63F 13/12 709/206 |
| 8,739,044 B1 | 5/2014 | Varadarajan | |
| 9,043,386 B2 | 5/2015 | Halevi et al. | |
| 9,141,645 B2 | 9/2015 | Lambourne et al. | |
| 9,207,905 B2 | 12/2015 | Millington | |
| 9,344,471 B2 | 5/2016 | Lee | |
| 2002/0002039 A1 | 1/2002 | Qureshey et al. | |
| 2002/0055973 A1 | 5/2002 | Low et al. | |
| 2002/0107973 A1 | 8/2002 | Lennon et al. | |
| 2002/0112244 A1 | 8/2002 | Liou et al. | |
| 2002/0180727 A1 | 12/2002 | Guckenberger et al. | |
| 2003/0200352 A1 | 10/2003 | Mohan et al. | |
| 2005/0039133 A1 | 2/2005 | Wells et al. | |
| 2005/0168630 A1 | 8/2005 | Yamada et al. | |
| 2005/0174482 A1 | 8/2005 | Yamada et al. | |
| 2005/0207728 A1 | 9/2005 | Nishitani | |
| 2005/0235334 A1 | 10/2005 | Togashi et al. | |
| 2006/0093044 A1 | 5/2006 | Grantham et al. | |
| 2006/0146765 A1 | 7/2006 | Van De Sluis et al. | |
| 2006/0267995 A1 | 11/2006 | Radloff et al. | |
| 2007/0250761 A1 | 10/2007 | Bradley et al. | |
| 2007/0265006 A1 * | 11/2007 | Washok | G06Q 30/02 455/435.1 |
| 2008/0052634 A1 * | 2/2008 | Fishkin | G06F 16/957 715/753 |
| 2008/0140849 A1 | 6/2008 | Collazo | |
| 2008/0155470 A1 | 6/2008 | Khedouri et al. | |
| 2008/0155615 A1 | 6/2008 | Craner et al. | |
| 2008/0229202 A1 | 9/2008 | Fang et al. | |
| 2009/0077474 A1 * | 3/2009 | Mohan | G06F 9/542 715/753 |
| 2009/0157497 A1 * | 6/2009 | Fusz | G06Q 30/02 705/14.56 |
| 2009/0198740 A1 * | 8/2009 | Braun | H04L 65/4015 |
| 2009/0217329 A1 | 8/2009 | Riedl et al. | |
| 2009/0271524 A1 * | 10/2009 | Davi | H04N 21/23433 709/231 |
| 2010/0030578 A1 | 2/2010 | Siddique et al. | |
| 2010/0169778 A1 | 7/2010 | Mundy et al. | |
| 2011/0085089 A1 | 4/2011 | Jung | |
| 2011/0109719 A1 | 5/2011 | Wilson et al. | |
| 2011/0307807 A1 * | 12/2011 | Norby | G06Q 10/101 715/758 |
| 2012/0060109 A1 | 3/2012 | Han et al. | |
| 2013/0089302 A1 | 4/2013 | Barnea et al. | |
| 2013/0191757 A1 | 7/2013 | Smith et al. | |
| 2013/0198298 A1 | 8/2013 | Li et al. | |
| 2014/0006915 A1 | 1/2014 | Bank et al. | |
| 2014/0019891 A1 | 1/2014 | Borah | |
| 2014/0280587 A1 | 9/2014 | Sharma et al. | |

FOREIGN PATENT DOCUMENTS

| | | |
|---|---|---|
| CN | 102325272 A | 1/2012 |
| CN | 102331841 A | 1/2012 |
| CN | 102595245 A | 7/2012 |
| WO | 2012051283 A2 | 4/2012 |

OTHER PUBLICATIONS

European Patent Office (EPO) European Office Action 2 for 13832722.6 dated Jan. 9, 2019 7 pages.

Ignacio Mas et al., "IPTV session mobility", Communications and Networking in China, 2008. CHINACOM 2008. Third International Conference on, IEEE, Piscataway, NJ, USA, Aug. 25, 2008 (Aug. 25, 2008), pp. 903-909, XP031364952 ISBN: 978-1-4244-2373-6 7 pages.

* cited by examiner

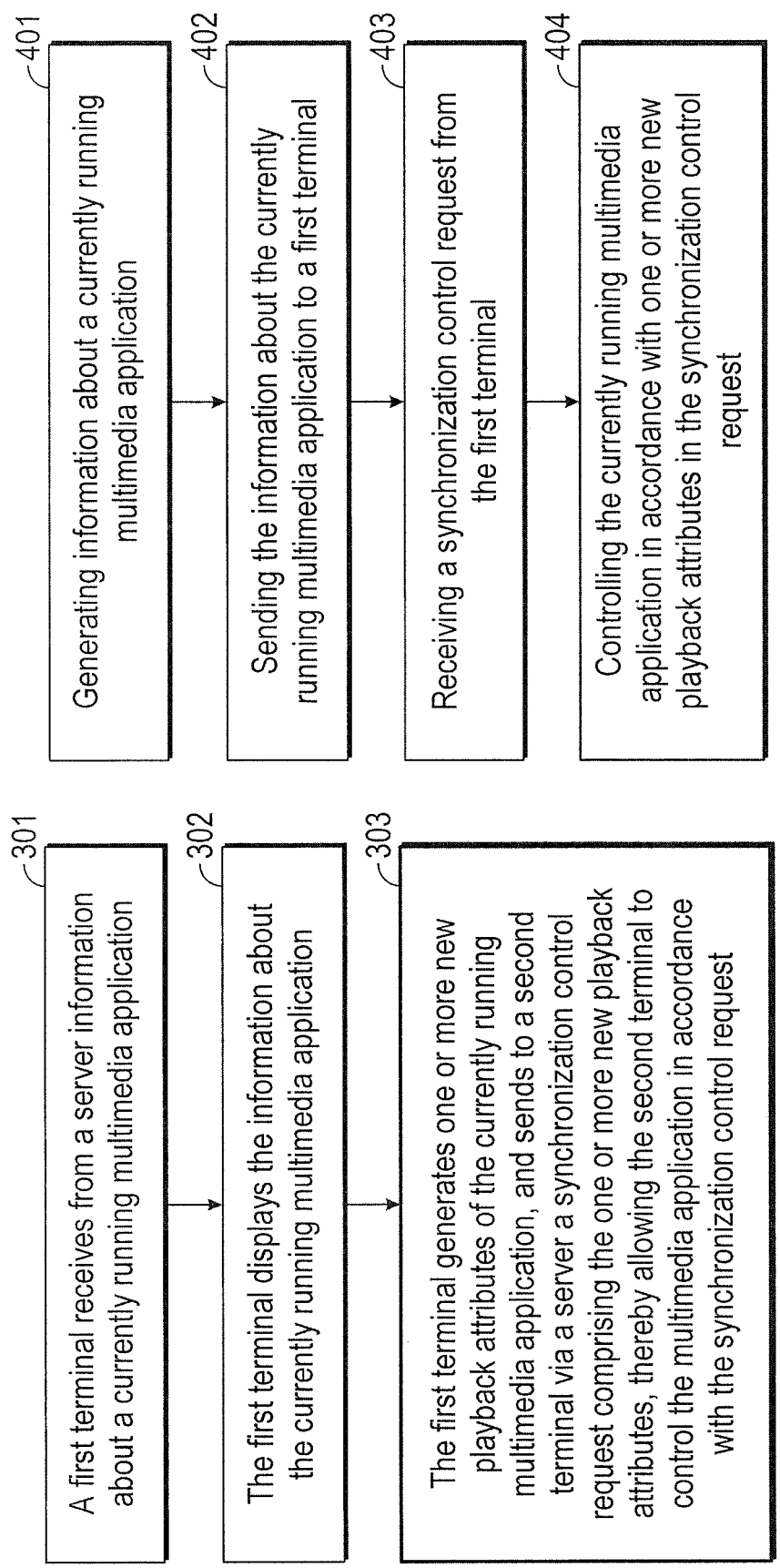

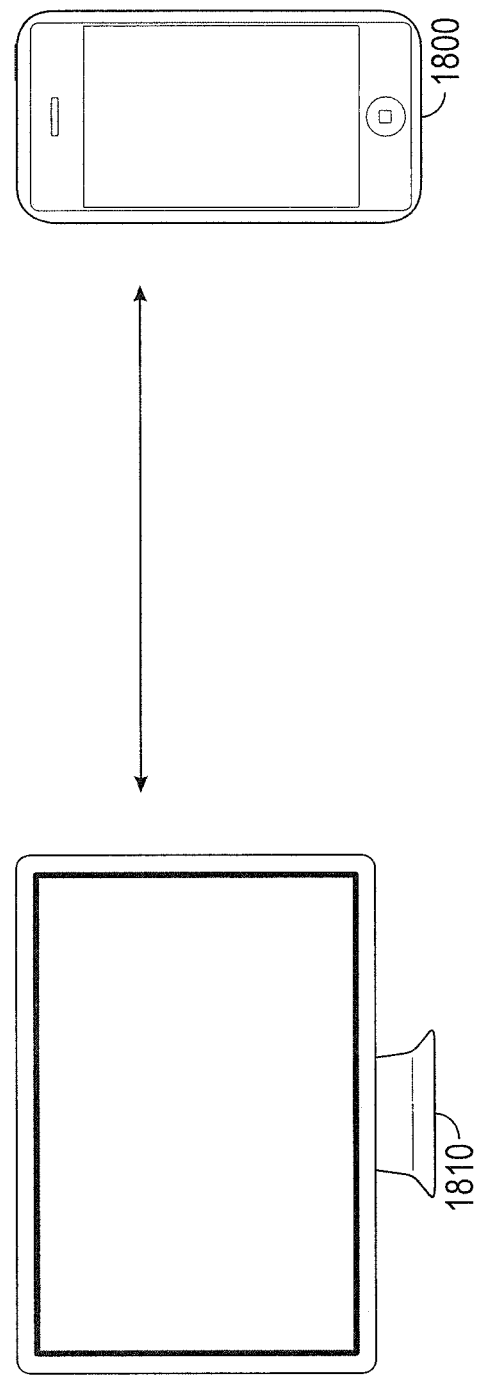

METHODS AND DEVICES FOR USING ONE TERMINAL TO CONTROL A MULTIMEDIA APPLICATION EXECUTED ON ANOTHER TERMINAL

CROSS REFERENCE TO RELATED APPLICATIONS

This application is a continuation application of U.S. patent application Ser. No. 14/099,826, filed on Dec. 6, 2013. U.S. patent application Ser. No. 14/099,826 is a U.S. continuation application under 35 U.S.C. § 111(a) claiming priority, under 35 U.S.C. § 120 and 365(c), to International Application No. PCT/CN2013/077791 filed on Jun. 24, 2013, which claims the priority benefit of Chinese Patent Application No. 201210311632.0, filed Aug. 29, 2012, the contents of which are incorporated by reference herein in their entirety for all purposes

TECHNICAL FIELD

The present disclosure relates generally to the field of the Internet, and more particularly, to methods and devices for controlling a multimedia application in a terminal.

BACKGROUND

With the continuous development of the Internet technology, people can obtain more and more multimedia resources from the Internet, and watch movies or listen to music from the Internet. Accordingly, various audio and video software applications for the playback of multimedia files from the Internet have been developed. There is a need to further improve user experience and increase the functionalities of these applications.

Currently, each user terminal in the Internet can only independently control the playback of multimedia files. There has been no combination of multiple terminals for the control of the playback of a multimedia file. When watching a movie or listening to music, users can control the playback only using the terminal playing the movie or music. For example, when watching an online video clip or listening to online music using a software player installed on a personal computer ("PC"), in order to control the playback of the video clip or music, a user must input commands into the PC via the software player. This greatly limits the user's flexibility in controlling the playback.

In order to obtain better multimedia playback effect, a multimedia playback device, such as a desktop computer, a large-screen television ("TV") or a home theater, typically has a large size and is not susceptible to frequent moves. In order to control the multimedia playback on such a device, a user must input commands into a control device, which is either a part of the playback device, or is connected with the playback device, through either wired or wireless connection. Examples of a control device being part of a playback device include buttons on a TV and the touch screen of a touch-screen PC, wherein users control the playback of multimedia files on the playback device by pressing the buttons or touching the touch screen. Examples of a control device connected to a playback device through wired connection include keyboard and mouse connected to a PC, wherein users control the playback of multimedia files on the PC by typing commands using the keyboard or clicking the mouse. Examples of a control device connected to a playback device through wireless connection include a remote control of a TV and wireless input devices of a PC such as wireless keyboard and wireless mouse connected to the PC wirelessly, such as via infrared or Bluetooth connection. While giving users the convenience of controlling playback from a distance, these wireless remote control devices have various disadvantages. For example, the functionalities of a TV remote control are limited by the buttons or keys on the remote control. Even if some of the keys are programmable, the resulting number of functions is still limited. Wireless keyboards and wireless mice can allow a user to take full advantage of all the functionalities of a PC. Their usefulness is limited in several respects, however. First, the wireless keyboard or mouse must be within a relatively short distance from the PC to which a receiver or adaptor is connected through wired connection in order to receive the control signal sent from the wireless device. In the case of infrared connection, there is the additional requirement that there is no block of the infrared beam between the wireless device and the receiver. Therefore, it is impossible, in the case of infrared connection, and almost impossible, in the case of Bluetooth connection, to control a PC outside the room in which the PC (and the receiver or adaptor) is located. Second, even though wireless keyboards and wireless mice allow a user to control a PC from a distance, the user still has to have visual contact with the PC's display in order to effect precise control, because all the control buttons are displayed in the PC's display and must be seen by the users in order to input any command to the PC. Even though it may be possible to effect the simplest playback control such as pause and stop using shortcut keys on a keyboard, most users do not memorize the shortcut keys. Even if they do memorize those shortcuts, in order to effect other controls, such as fast forward or selecting a file to play, visual contact with the PC's display must be established. These all make it impossible to control the playback from a distance far enough to reduce or eliminate the visibility of the PC's display. Third, none of the methods of control above is secure in that any person, having gained access to the control device, can control the playback using the control device. In other words, recognition and/or paring of a control device by the TV or PC is the only means by which the TV or PC can execute user commands sent from the control device.

SUMMARY OF THE DISCLOSURE

One of the technical problems to be solved by embodiments of the present disclosure is to provide methods and devices for terminal control, thereby allowing one terminal in the Internet to control the multimedia playback on another terminal. This can accomplish the combination of hardware advantages of both terminals and can increase the efficiency of playback control.

To solve the above-identified technical problem, an embodiment of the disclosure provides a terminal control method. The method comprises:

receiving a synchronization request from a first terminal, the synchronization request being configured to obtain information about a currently running multimedia application, the information comprising application identification and one or more playback attributes of the currently running multimedia application, obtaining the information from a second terminal in accordance with the synchronization request, and sending the information to the first terminal.

Another embodiment of the present disclosure provides a terminal control method. The method comprises:

sending a synchronization request to a terminal to obtain information about a currently running multimedia application, the information comprising application identification and one or more playback attributes of the currently running multimedia application, receiving the information from the terminal, and displaying the information.

Another embodiment of the present disclosure provides a terminal control method. The method comprises:

receiving a synchronization request from a terminal, the synchronization request being configured to obtain information about a currently running multimedia application, the information comprising application identification and one or more playback attributes of the currently running multimedia application, generating the information in accordance with the synchronization request, and sending the information to the terminal.

In addition, an embodiment of the present disclosure provides a terminal. The terminal comprises:

a synchronization information obtaining module, configured to obtain from a second terminal information about a currently running multimedia application, the information comprising application identification and one or more playback attributes of the currently running multimedia application, a synchronization information display module, configured to display the information, and a synchronization control module, configured to generate one or more new playback attributes of the currently running multimedia application in accordance with one or more user commands, and to send a synchronization control request comprising the one or more new playback attributes to the second terminal, thereby allowing the second terminal to control the currently running multimedia application in accordance with the one or more new playback attributes in the synchronization control request.

Furthermore, an embodiment of the present disclosure provides a network server. The network server comprises:

a synchronization request receiving module, configured to receive a synchronization request from a first terminal, the synchronization request being configured to obtain information about a currently running multimedia application, the information comprising application identification and one or more playback attributes of the currently running multimedia application, and a synchronization information returning module, configured to obtain the information from a second terminal in accordance with the synchronization request, and to send the information to the first terminal.

In addition, an embodiment of the present disclosure provides a terminal. The terminal comprises:

a synchronization request receiving module, configured to receive a synchronization request from another terminal, the synchronization request being configured to obtain information about a currently running multimedia application, the information comprising application identification and one or more playback attributes of the currently running multimedia application, a synchronization information generating module, configured to generate the information in accordance with the synchronization request, a synchronization information sending module, configured to send the information to the other terminal, a synchronization control request receiving module, configured to receive a synchronization control request from the other terminal, the synchronization control request comprising one or more new playback attributes of the currently running multimedia application, and a multimedia control module, configured to control the currently running multimedia application in accordance with the one or more new playback attributes in the synchronization control request.

The embodiments have the following beneficial effects: a first terminal can obtain relevant information about a multimedia application currently running on a second terminal and display the information on the first terminal, thereby allowing a user to monitor the multimedia playback situation on the second terminal from the first terminal, to trigger the generation of a new playback request, and to send the playback request to the second terminal, and ultimately accomplishing control of the playback of multimedia files on the second terminal. In other words, the embodiments allow the transfer of multimedia control on one terminal to another terminal through controlling the multimedia playback via a non-multimedia playback terminal across the Internet. With reasonable selection of a multimedia controlling terminal, the playback control on one terminal is no longer limited by the terminal's own hardware but can be carried out by the multimedia controlling terminal, which may have superior hardware over the terminal on which a multimedia file is being played.

BRIEF DESCRIPTION OF THE DRAWINGS

FIG. 5 is a flowchart illustrating an example of the flow of a terminal control method at the controlling side according to various embodiments.

FIG. 6 is a flowchart illustrating an example of the flow of a terminal control method at the controlled side according to various embodiments.

FIG. 18A is a system diagram illustrating an example system according to various embodiments.

DETAILED DESCRIPTION

Figure 1:
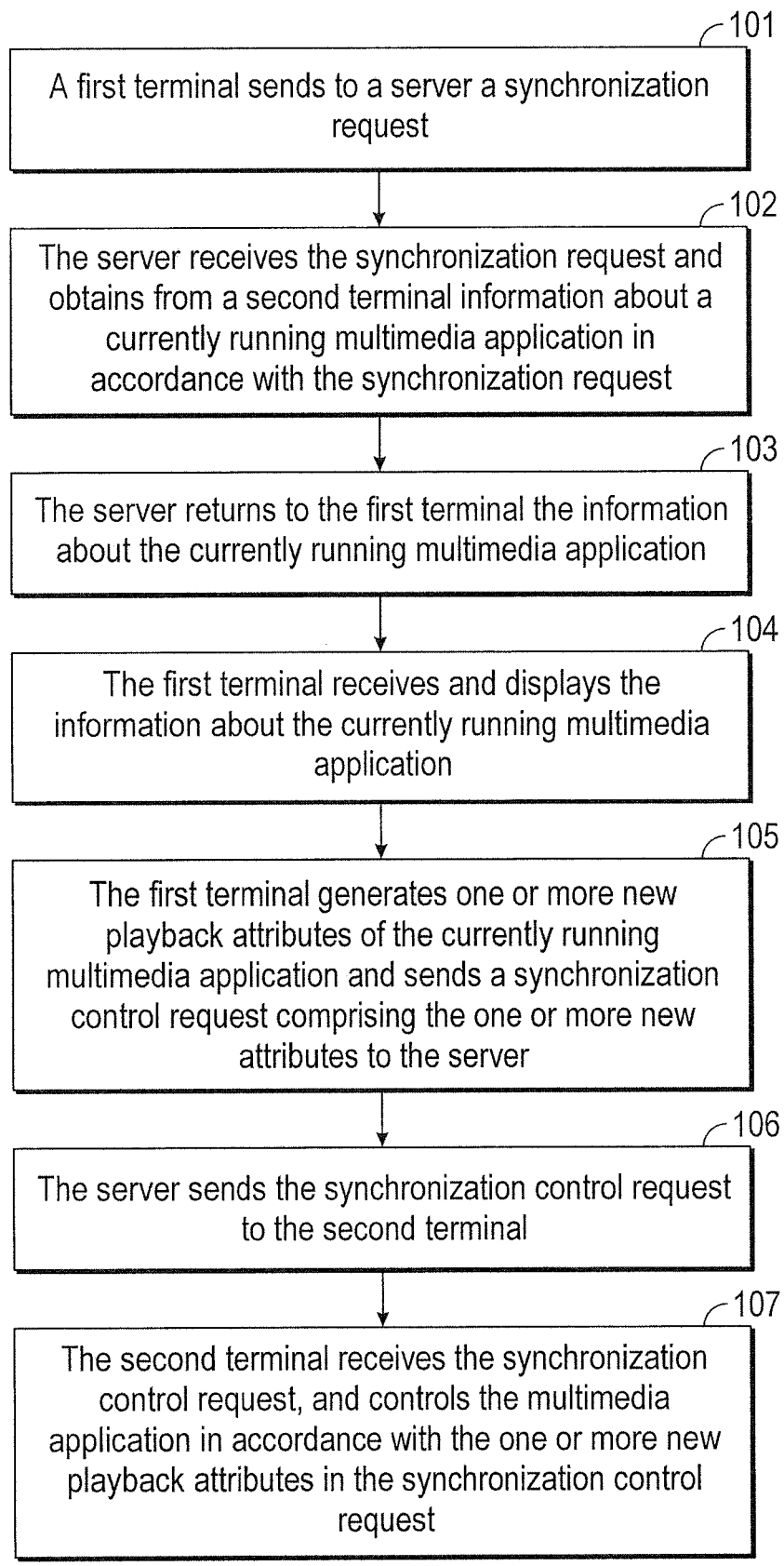
FIG. 1 is a flowchart illustrating an example of the flow of a terminal control method according to various embodiments.

In the following description of embodiments, reference is made to the accompanying drawings which form a part hereof, and in which it is shown by way of illustration specific embodiments of the disclosure that can be practiced. It is to be understood that other embodiments can be used and structural changes can be made without departing from the scope of the disclosed embodiments.

The present disclosure relates generally to the field of the Internet, and more particularly, to methods and devices for controlling a multimedia application in a terminal from a different terminal. As used herein, a device on which a multimedia file is being played and the playback of it is being controlled by another device is referred to as a "controlled device." A device with which a user interacts directly to effect the control of a multimedia application on a controlled device is referred to as a "controlling device." Controlling devices and controlled devices are herein collectively referred to as "terminal devices." Accordingly, a terminal device can be either a controlling device or a controlled device. According to some embodiments, a terminal device can be a device not susceptible to frequent moves (referred to herein as a "non-mobile device," although it is not impossible to move the device), e.g., a desktop PC or a smart TV. In some other embodiments, a terminal device can be a mobile device, e.g., a tablet PC (including, but not limited to, Apple iPad and other touch-screen devices running Apple iOS, Microsoft Surface and other touch-screen devices running the Windows operating system, and tablet devices running the Android operating system), a mobile phone, a smartphone (including, but not limited to, an Apple iPhone, a Windows Phone and other smartphones running Windows Mobile or Pocket PC operating systems, and smartphones running the Android operating system, the Blackberry operating system, or the Symbian operating system), an e-reader (including, but not limited to, Amazon Kindle and Barnes & Noble Nook), a laptop computer (including, but not limited to, computers running Apple Mac operating system, Windows operating system, Android operating system and/or Google Chrome operating system), or an on-vehicle device running any of the above-mentioned operating systems or any other operating systems, all of which are well known to those skilled in the art.

Although embodiments disclosed herein may be described and illustrated herein as involving a mobile terminal device controlling a multimedia application on a non-mobile terminal device, it should be understood that the embodiments are not so limited, but can be additionally applicable to, for example, a mobile terminal device controlling a multimedia application on another mobile terminal device, an non-mobile terminal device controlling a multimedia application on a mobile terminal device, and a non-mobile terminal controlling a multimedia application on another non-mobile terminal device. Furthermore, although embodiments may be described and illustrated herein in terms of a single controlling device/single controlled device system, it should be understood that some embodiments can include systems using a single controlling device and multiple controlled devices, multiple controlling devices and a single controlled devices, and other configurations.

According to some embodiments, a terminal device includes or is connected to an output device by which a multimedia file that is being played by the terminal device is perceived by the intended audience in accordance with the format of the multimedia file. In some example embodiments, such an output device can be a display device by which an intended audience can see the image(s) included in the multimedia file, e.g., a touch screen, a computer monitor, a smart TV screen, or an LCD display. In some other example embodiments, such an output device can be an audio output device such as a loudspeaker, a headphone, or an earphone by which an intended audience can hear the sound included in the multimedia file. Some output devices are integrated into the controlled device, e.g., a touch screen on a tablet PC or a built-in speaker of a PC. Some other output devices can be connected to the controlled device via either wired or wireless connection, e.g., a stand-alone loudspeaker connected via wired connection to the "output" port of a PC, a VGA or HDMI display device connected to the VGA or HDMI port of a PC, or a stereo headphone connected to a terminal device either via wired connection or via wireless connection such as Bluetooth. Methods of connecting such output devices to a terminal device are well known to those skilled in the art.

In some other example embodiments, a controlled device does not include or is not connected to an output device itself and the running of a multimedia application is perceived by the intended audience via an output device as part of, or connected to, a third device. In some other example embodiments, each of the controlled device and the third device either includes or is connected to one or more output devices, but the user can only perceive the running of the multimedia application via the output devices connected to only one of the controlled device and the third device. By way of example, some embodiments involve the control of a multimedia application on a controlled device in an office, where the user is remotely connected to the controlled device in the office via Citrix or remote desktop and watching from home using a third device at home the mirror image of what is intended to be displayed on a display device as part of or connected to the controlled device in the office. In this case, the user is controlling the multimedia application on the controlled device in the office but watching the running of the multimedia application displayed at home, regardless of whether the display device as part of or connected to the controlled device is turned on and displaying the running of the multimedia application simultaneously. Methods of remote desktop connection are well known to those skilled in the art. It is also well known to those skilled in the art how to set up a remote desktop connection such that the third device can output via its own output device not only images but also sounds sent from the controlled device, the playback of which is in turn controlled by the controlling device.

Controlling a multimedia application on a device using a separate device can provide advantages. For example, the separate controlling device can provide more functionalities than a remote control, liberate the user from a limited distance from the controlled device and/or obviate the need for visual contact with any display either as part of or connected to the controlled device. In addition, using two devices can also enhance the security of the control and allow the personalization of the control because of verification processes that can be implemented in the process of synchronizing information between the controlling device and the controlled device. Any of the above advantages, either alone or in combination, can greatly enhance user experience and the ease and convenience of controlling a multimedia application on a device.

As used herein, "multimedia" is not limited to audio or video but also includes all forms of audio and/or visual (e.g., textual, graphic, video) information that can be output by a device and perceived by a user of the device. For example, multimedia playback can take the form of playing a piece of music or reading an audio book by a device, or displaying an e-book or a slideshow of a number of pictures, or playing a movie or any other video clip. A "multimedia file" that is playable by a device does not have to be a file previously stored on the device, or on a storage device or media connected to the device, e.g., a USB drive, an external hard drive, or a compact disc or DVD; it can include multimedia streamed to the device via a server to which the device is connected, or via the Internet. Methods of connecting a device to a server or the Internet are well known to those skilled in the art. "Control" of the playback of a multimedia file can include not only the basic control functions such as volume control, play, pause, stop, fast forward, reverse (in the case of an audio or video file), or turn to the next or previous page or slide (in the case of an e-book or a Microsoft Office file), but also such other features as the adjustment of the playback speed and the fast forward or reverse speed, or how fast the pages should be turned or the slides should proceed. According to some embodiments, the controlling device can perform all kinds of controls the controlled device can have on the playback of a multimedia file playable on the controlled device. As used herein, a "multimedia application" means an application that can play a multimedia file and/or manage a multimedia file. Accordingly, a multimedia application does not necessarily have multimedia playback functionality, i.e., it does not have to be a multimedia player. Modern multimedia players often do have multimedia file management functionalities, e.g., some supports creating and managing local and/or online playlists or libraries. Examples of multimedia applications include, but are not limited to, Windows Media Player, RealPlayer, QuickTime Player, Flash Player, and e-reader applications such as those in Amazon Kindle or Barnes & Noble Nook. Functionalities of various multimedia applications and how to achieve those functionalities are well known to those skilled in the art. For example, some multimedia applications support the display of lyrics or subtitles when an audio or video file is being played by it. Some multimedia applications support the random playing or playing with a pre-determined or customizable order of a number of multimedia files. Some multimedia applications allow users to organize their collection of multimedia files by supporting automatic or customized generation of playlists or libraries of multimedia files. In various embodiments, these functionalities can all be controlled by the controlling device. As used herein, a "currently running multimedia application" means that the multimedia application is being run on the device on which it is installed. Consistent with the description of multimedia applications above, a currently running multimedia application does not necessarily mean that the multimedia application is currently playing a multimedia file.

FIG. 1 is a schematic diagram illustrating an example of the flow of a terminal control method according to various embodiments. The method can comprise the following steps.

Step 101: a first terminal sends a synchronization request to a server, the synchronization request configured to obtain information about a currently running multimedia application, and the information comprising the application identification of the multimedia application and one or more playback attributes of the multimedia application.

According to some embodiments, the first terminal can be an application installed on a mobile device or a non-mobile device. According to some embodiments, the first terminal and the currently running multimedia application are installed on a same device. According to some other embodiments, the first terminal and the currently running multimedia application are installed on different devices.

According to some embodiments, the first terminal can itself be a multimedia application. According to some other embodiments, the first terminal can be an application other than a multimedia application regardless of whether the device on which the first terminal is installed has a multimedia application or not.

Step 102: the server receives the synchronization request and obtains from a second terminal the information about the currently running multimedia application in accordance with the synchronization request.

According to some embodiments, the second terminal can be an application installed on a mobile device or a non-mobile device. According to some embodiments, the first terminal and the second terminal are installed on a same device. According to some other embodiments, the first terminal and the second terminal are installed on different devices. According to some embodiments, the second terminal and the currently running application are installed on a same device. According to some other embodiments, the second terminal and the currently running application are installed on different devices. Accordingly, in various embodiments, a synchronization request can be configured to obtain the information about a multimedia application currently running on a specific device, for example, on the device on which the second terminal is installed, or on another device different from the device on which the second terminal is installed.

According to some embodiments, the second terminal can itself be a multimedia application. According to some other embodiments, the second terminal can be an application other than a multimedia application regardless of whether the device on which the second terminal is installed has a multimedia application or not, as long as the second terminal has authority to obtain the information about the currently running multimedia application, while also having the capability to send control information to the currently running multimedia application and to control it. According to some embodiments, the second terminal is the currently running multimedia application.

According to some embodiments, the first terminal can have account login function. According to some other embodiments, the second terminal can have account login function. As used herein, "account login function" refers to the capability of a terminal to determine whether an account has been logged in from the device or the operating system on which the terminal is installed and to act differently based on whether the account has been logged in. The account can be either a local account with respect to the device or operating system on which the terminal is installed, or an online account. There are different reasons for having an account login function. For example, an account can be used to grant or deny access to a terminal, i.e., only after a successful login can a user use a terminal. An account can also be used to grant or deny access to certain functions of a terminal, e.g., a user can use some functions of a terminal but not all the functions without logging in an account and can use all the functions of the terminal only after a successful login. For example, when a terminal is a multimedia player, setting up an account can allow a user or an online service provider to decide what content the multimedia player can or cannot play with or without a successful login. For example, in order to access and play certain content provided by an online service provider using a terminal, a user must have set up an account with the online service provider and successfully logged in the account from a device on which the terminal is installed.

As used herein, and consistent with the description of multimedia applications above, a "playback attribute" of a multimedia application does not necessarily relate to the playback of a multimedia file, although it certainly may, but can include any attribute of a multimedia application or of a multimedia file which the multimedia application can play and/or manage. Examples of playback attributes of a multimedia application include, but are not limited to, the title and length of the multimedia file currently being played by the multimedia application (e.g., in terms of the amount of time it would take to complete playback of the file at the current playback speed, or the number of pages of an e-book), at what time point (or page number) the file is currently being played, at what volume, brightness, contrast, etc., the file is being played, whether lyrics or subtitle has been turned on, the lyrics of a song being played, the subtitle of a movie being played, the identity of each multimedia file in the current playlist or in a library recognizable by the multimedia application, and the title, length and status of each of those multimedia files (e.g., whether a certain multimedia file has been downloaded to the device on which the currently running multimedia player is installed or whether the right to play a multimedia file has been paid for, viewers' comments and/or critics' comments on a movie, etc.), the identity of each library in a collection of libraries, the title, length and status (e.g., whether a certain multimedia file has been downloaded to the device on which the currently running multimedia player is installed or whether the right to play a multimedia file has been paid for, viewers' comments and/or critics' comments on a movie, etc.) of each of the multimedia files in each library in the collection of libraries, and the playback history of the multimedia player. According to some embodiments, the synchronization request can include a request for all the playback attributes recognizable by the second terminal. According to some other embodiments, the synchronization request can include a pre-determined subset of those attributes, either by default or as customizable by a user. By way of example only, a synchronization request can include a request for the lyrics of a song being played only, or other information about the playback of the song, e.g., the song's title, the volume at which the song is being played, the progress of the playback, i.e., at what time point in the entire length of the song it is currently being played and/or the title and length information of all the other songs in the same library containing the song currently being played.

According to some embodiments, the first terminal and the second terminal are synchronized only after a verification process. According to some other embodiments, a verification process is available but optional. A verification process provides an opportunity to deny the synchronization request from a controlling device if the controlling device does not meet one or more criteria. Therefore, the verification process can add an additional layer of security in that even if a user has obtained access to a controlling device, she still cannot effect control over the controlled device unless and until the controlling device has met the one or more criteria. According to some embodiments, the verification criteria can comprise identification information of the first terminal or the device on which the first terminal is installed. According to some other embodiments, the verification criteria can comprise the first terminal's account login information. As used herein, a terminal's "account login information" means information indicating that an account has been logged in from the device on which the terminal is installed. According to some embodiments, the verification process can be carried out by a server.

According to some embodiments, a synchronization request can comprise identification information of the first terminal or the device on which the first terminal is installed. According to these embodiments, in the process of obtaining from the second terminal the information about the currently running multimedia application, the server can verify whether the identification information of the first terminal or the device on which the first terminal is installed entitles the first terminal to obtain the information about the currently running multimedia application, and request to obtain from the second terminal the information about the currently running multimedia application when and only when the verification result is positive.

According to some other embodiments, a synchronization request can comprise the first terminal's account login information. In these embodiments, in the process of obtaining from the second terminal the information about the currently running multimedia application, the server can verify whether the account logged in from the device on which the first terminal is installed has authority to obtain the information about the currently running multimedia application, and request to obtain from the second terminal the information about the currently running multimedia application when and only when the verification result is positive.

An example verification process by a server based on identification information can be as follows: when the synchronization request comprises identification information of the first terminal or of the device on which the first terminal is installed, the server receives the synchronization request and, in accordance with the synchronization request, verifies whether the identification information matches information stored on the server or is within a whitelist configured for the server. When and only when the result of the verification is positive, the server requests to obtain from the second terminal the information about the currently running multimedia application.

An example verification process by a server based on a terminal's account login information can be as follows: when the synchronization request comprises the first terminal's account login information, the server receives the synchronization request and, in accordance with the synchronization request, verifies whether the account logged in from the device on which the first terminal is installed entitles the first terminal to obtain the information about the currently running multimedia application. When and only when the verification result is positive, the server requests to obtain from the second terminal the information about the currently running multimedia application.

The account login information can include single account login information or group account login information. As used herein, "single account" means an account that is not a member of a group account, while "group account" means a collection of member accounts. Usually members of a group account share the same privileges and/or restrictions that are defined for that group. As used herein, a terminal's "single account login information" means information indicating that a single account has been logged in from the device on which the terminal is installed, and a terminal's "group account login information" means information indicating that an account belonging to a group account has been logged in from the device on which the terminal is installed. In some example embodiments, if the first terminal and the second terminal are applications separately installed on two physically separate devices, a user can log in account A on a device on which the first terminal is installed and can also log in account A on a device on which the second terminal is installed. If account A is a single account, then during the verification process, the server will know that the same account has been logged in using both the first terminal and the second terminal. In some other example embodiments, a user can log in account a1 one a device on which the first terminal is installed, and log in account a2 on a device on which the second terminal is installed. If accounts a1 and a2 belong to a same group account A, then during the verification process, the server will know that both the first terminal and the second terminal have been used to log in accounts belonging to the same group account A. There are various methods to set up a group account and these methods are well known to those skilled in the art. For example, a same user can have multiple accounts for different applications or even a same application that belong to a group account. Different users can also have their accounts grouped together to form a group account based on certain association relationship. Information about the association relationship can be stored in the server.

In accordance with the various methods to set up accounts, the server can employ various principles to determine whether an account logged in from a device on which a first terminal is installed entitles the first terminal to obtain the information about the currently running multimedia application. By way of examples only, when the account logged in from the device on which the first terminal is installed is the same as the account logged in from the device on which the second terminal is installed, the server can determine that the first terminal has authority to obtain the information. Or, when the account logged in from the device on which the first terminal is installed and the account logged in from the device on which the second terminal is installed belong to a same group account, the server can determine that the first terminal has authority to obtain the information. Or, when the account logged in from the device on which the first terminal is installed is an account within a specific whitelist configured for the server, the server can determine that the first terminal has authority to obtain the information. These principles and how to apply these principles to achieve account verification are well known to those skilled in the art.

Of course, the verification process does not have to be configured on any server. Instead, the first terminal and the second terminal can complete the verification process through prior negotiation. After the verification is completed, the first terminal or the second terminal can then start the synchronization process to achieve synchronized control. Methods of terminal-terminal negotiation and verification are well known to those skilled in the art.

According to some embodiments, the result of a verification process is not a complete denial or allowance of a synchronization request. Instead, part of a synchronization request may be allowed and part denied. For example, the first terminal is allowed to obtain certain but not other information about the currently running multimedia application. In these embodiments, the server serves as a filter rather than a gate. This can be achieved by associating the identification information of the first terminal or the device on which the first terminal is installed, or the first terminal's login information, with different privileges/restrictions or different levels of privileges/restrictions. By way of examples only, a particular first terminal identification, or a particular identification of the device on which a first terminal is installed, or a particular account logged in from the device on which the first terminal is installed, entitles the first terminal to obtain certain but no other information about the currently running multimedia application. In another example, only when the same account has been logged in from both the device on which the first terminal is installed and the device on which the second terminal is installed, will the first terminal be allowed to obtain all information about the currently running multimedia application, while the first terminal is allowed to obtain only some but not other information about the currently running multimedia application if the account logged in from the device on which the first terminal is installed is only within a same group account but different from the account logged in from the device on which the second terminal is installed, or if the account logged in from the device on which the first terminal is installed is only within a whitelist configured for the server but different from the account logged in from the device on which the second terminal is installed. Methods of associating accounts with different privileges/restrictions or different levels of privileges/restrictions and the principles to apply a filter on the server in accordance therewith are well known to those skilled in the art.

Step 103: the server sends to the first terminal the information about the currently running multimedia application.

Step 104: the first terminal receives and displays the information about the currently running multimedia application.

Figure 3:
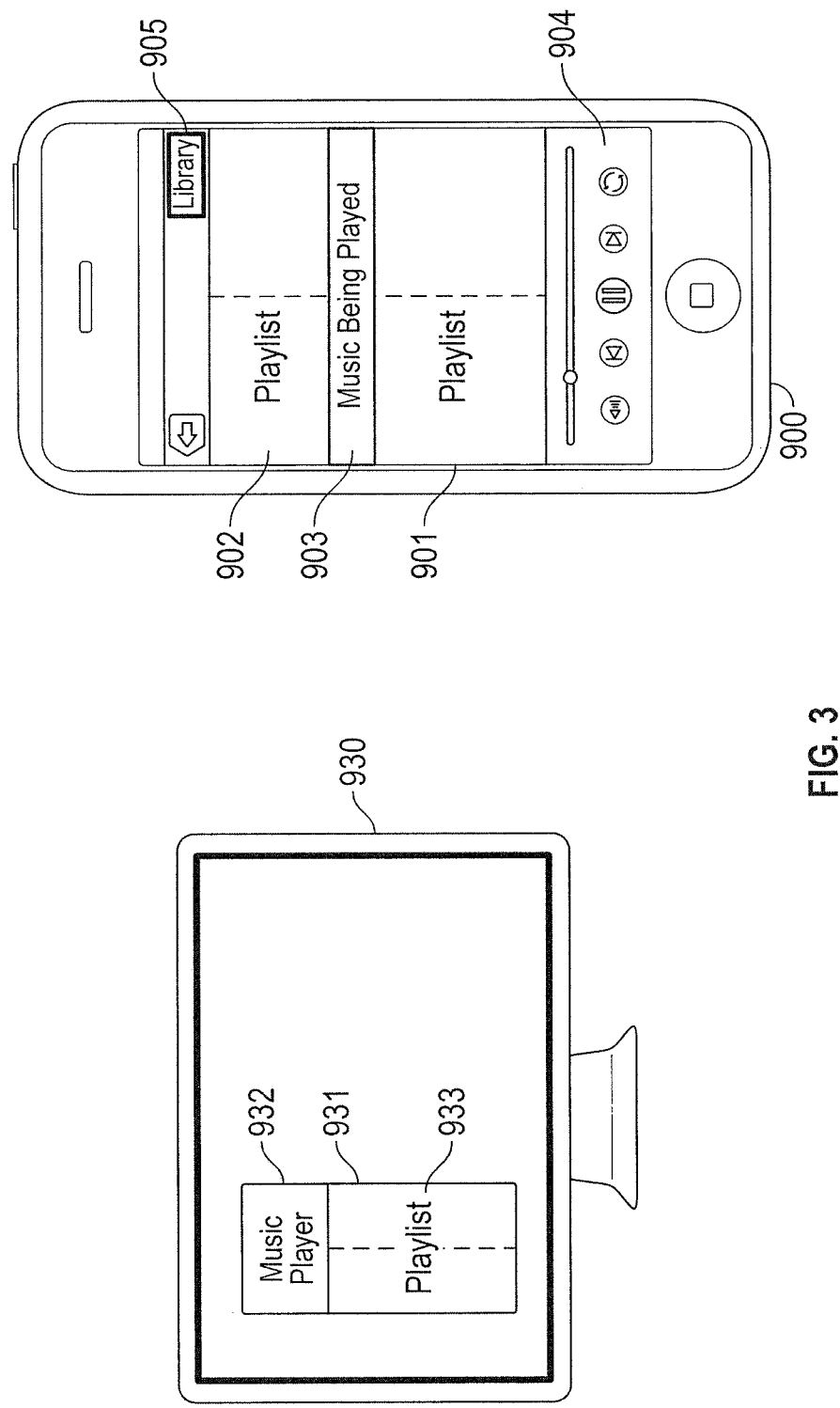
FIG. 3 is an example of user interfaces synchronizing music playback information between a first terminal and a second terminal according to various embodiments.

FIG. 3 is an example of user interfaces synchronizing music playback information between a first terminal and a second terminal according to various embodiments. As shown in FIG. 3, a display 930 connected to the device on which the second terminal is installed is displaying certain contents 931, which indicate that the second terminal (or the device on which the second terminal application is installed) is running a music player 932 with a playlist 933. A first terminal 900, which is depicted as a mobile phone in FIG. 3, also displays certain contents 901, which include information relevant to the music player on the device on which the second terminal is installed, such as a playlist 902, with the title of the music file currently being played by the second terminal highlighted 903. The first terminal 900 also displays a number of control buttons 904, such as volume control, start/pause, previous, next, repeat, and timeline of the music playback with an indicator of the current time of the music playback along the timeline that can be dragged by a user forward or backward to change the progress of the current music playback. The first terminal can also display a shortcut to a music library 905 synchronized with a music library on the second terminal. The music library on the first terminal does not necessarily have any music files but can include information about certain attributes of the music files stored in the music library on the second terminal or online, e.g., identification information such as the titles, lengths of the music files and their relevant musicians/ singers. A user of the first terminal can select music files to be played from the music library and compile these selected music files into a playlist, thereby remotely controlling from the first terminal the playback of the selected files on the second terminal.

Figure 4:
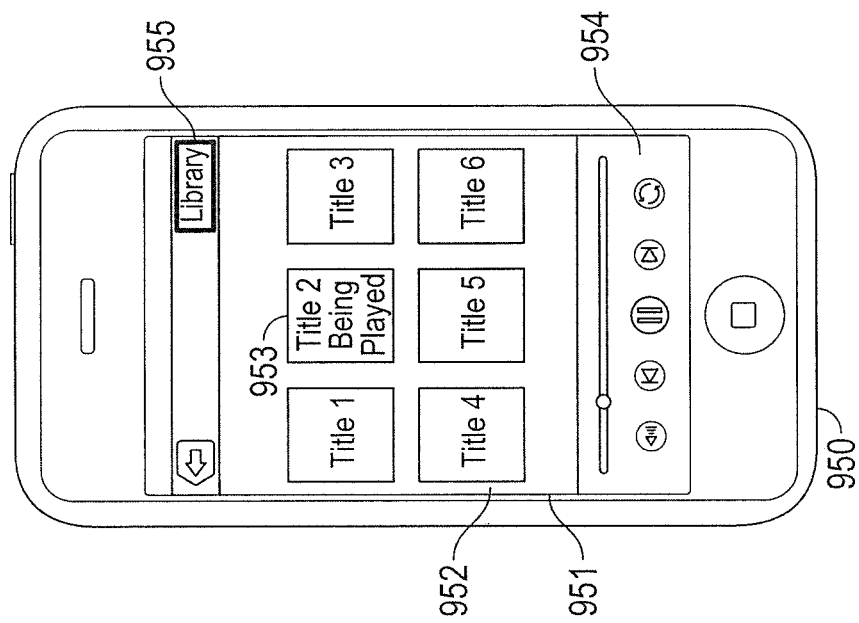
FIG. 4 is an example of user interfaces synchronizing video playback information between a first terminal and a second terminal according to various embodiments.

FIG. 4 is an example of user interfaces synchronizing video playback information between a first terminal and a second terminal according to various embodiments. As shown in FIG. 4, a display 980 connected to the device on which the second terminal is installed is displaying certain contents 981, which indicate that the second terminal (or the device on which the second terminal application is installed) is running a video player playing a video 981. A first terminal 950, which is depicted as a mobile phone in FIG. 4, also displays certain contents 951, which include information relevant to the video player on the device on which the second terminal is installed, such as a playlist 952, with the title of the video file currently being played by the second terminal highlighted 953. The first terminal 950 also displays a number of control buttons 954, such as volume control, start/pause, previous, next, stop, and timeline of the video playback with an indicator of the current time of the video playback along the timeline that can be dragged by a user forward or backward to change the progress of the current video playback. The first terminal can also display a shortcut to a video library 955 synchronized with a video library on the second terminal. The video library on the first terminal does not necessarily have any video files but can include information about certain attributes of the video files stored in the video library on the second terminal or online, e.g., identification information such as the titles, lengths, thumbnail shots, and summaries of the videos. A user of the first terminal can select a video file to be played from the video library and compile these selected video files into a playlist, thereby remotely controlling from the first terminal the playback of the selected files on the second terminal.

According to the embodiments illustrated in FIG. 3 and FIG. 4, the first terminal can also display some virtual control keys for controlling the multimedia application, in addition to displaying the playlists. By way of examples only, the control keys can include: sound adjustment, pause, play, play previous one, play next one, loop playback, etc. Of course, if supported by the functionalities of the device on which the first terminal is installed, the control keys need not be virtual keys displayed on the screen, but can be physical buttons on the device, each corresponding to a specific control operation. In designing the first terminal and the device on which the first terminal is installed, the above playback control keys can be specifically designed. Usually, one can import all the control functions of a relevant multimedia application from the second terminal into the first terminal and configure the same control functions in the first terminal. Alternatively, a pre-determined subset of all the control functionalities can be imported into the first terminal, either by default or as customizable by a user.

Step 105: the first terminal, based on one or more user commands, generates one or more new playback attributes of the currently running multimedia application, and sends to the server a synchronization control request comprising the one or more new playback attributes. In this step, the first terminal typically generates a new playback attribute based on a user's trigger, and the new playback attribute constitutes a control command, setting a playback attribute different from the prior playback attribute. For example, a new playback attribute comprises a volume different from the volume in the prior playback attribute.

There are various ways to trigger a control command. According to some embodiments, the first terminal can monitor specific key pressing events and generate corresponding control commands in accordance with the specific key pressing events. The keys being pressed can be either virtual keys or real keys. FIG. 3 and FIG. 4 illustrate examples where the keys are virtual keys. As discussed above, those skilled in the art also know how to configure real keys, the pressing of which can generate specific control commands. According to some other embodiments, when the device on which the first terminal is installed adopts touch-screen technology and the first terminal is compatible with touch-screen technology, the first terminal can monitor touching actions and generate corresponding control commands in accordance with certain detected touching actions. For example, when it detects a sliding motion to the right as a result of a touching action, it can generate a command requesting to play the next multimedia file. According to still some other embodiments, the first terminal can monitor gravity sensing events, and generate corresponding control commands in accordance with certain detected gravity sensing events. For example, shaking the device on which the first terminal is installed can result in the first terminal generating a command requesting to play the next multimedia file. According to yet some other embodiments, the first terminal can monitor voice commands and generate control commands in accordance with certain detected voice commands. For example, when it detects a voice "next," it can generate a command requesting to play the next multimedia file. Methods to trigger the generation of control commands are well known to those skilled in the art.

Step 106: the server sends the synchronization control request to the second terminal.

According to some embodiments, the first terminal can control the currently running multimedia application only after a verification process, even though the first terminal can obtain and display information about the currently running multimedia application. According to some other embodiments, such a verification process is available but optional. Such a verification process provides an opportunity to deny the synchronization control request from a controlling device if the controlling device does not meet one or more criteria. Therefore, the verification process can add an additional layer of security in that even if a user has obtained access to a controlling device and the information about the currently running multimedia application, she still cannot control the controlled device unless and until the controlling device has met the one or more criteria. According to some embodiments, the verification criteria can comprise identification information of the first terminal or the device on which the first terminal is installed. According to some other embodiments, the verification criteria can comprise the first terminal's account login information. According to some embodiments, the verification process can be carried out by a server.

According to some embodiments, a synchronization control request can comprise identification information of the first terminal or the device on which the first terminal is installed. According to these embodiments, in the process of sending the synchronization control request from the first terminal to the second terminal via the server, the server can verify whether the identification information of the first terminal or the device on which the first terminal is installed entitles the first terminal to control the currently running multimedia application, and send the synchronization control request to the second terminal when and only when the verification result is positive.

According to some other embodiments, a synchronization control request can comprise the first terminal's account login information. In these embodiments, in the process of sending the synchronization control request from the first terminal to the second terminal via the server, the server can verify whether the account logged in from the device on which the first terminal is installed has authority to control the currently running multimedia application, and send the synchronization control request to the second terminal when and only when the verification result is positive.

An example verification process by a server based on identification information can be as follows: when the synchronization control request comprises identification information of the first terminal or of the device on which the first terminal is installed, the server receives the synchronization control request and, in accordance with the synchronization control request, verifies whether the identification information matches information stored on the server or is within a whitelist configured for the server. When and only when the result of the verification is positive, the server sends the synchronization control request to the second terminal.

An example verification process by a server based on a terminal's account login information can be as follows: when the synchronization control request comprises the first terminal's account login information, the server receives the synchronization control request and, in accordance with the synchronization control request, verifies whether the account logged in from the device on which the first terminal is installed entitles the first terminal to control the currently running multimedia application. When and only when the verification result is positive, the server sends the synchronization control request to the second terminal.

There are various methods to set up accounts and various principles which the server can employ to determine whether an account logged in from a device on which a first terminal is installed entitles the first terminal to control the currently running multimedia application. By way of examples only, when the account logged in from the device on which the first terminal is installed is the same as the account logged in from the device on which the second terminal is installed, the server can determine that the account logged in from the device on which the first terminal is installed has authority to control the currently running multimedia application. Or, when the account logged in from the device on which the first terminal is installed and the account logged in from the device on which the second terminal is installed belong to a same group account, the server can determine that the account logged in from the device on which the first terminal is installed has authority to control the currently running multimedia application. Or, when the account logged in from the device on which the first terminal is installed is an account within a specific whitelist configured for the server, the server can determine that the account logged in from the device on which the first terminal is installed has authority to control the currently running multimedia application. These principles and how to apply these principles to achieve account verification are well known to those skilled in the art.

Of course, the verification process does not have to be configured on any server. Instead, the first terminal and the second terminal can complete the verification process through prior negotiation. After the verification is completed, the first terminal or the second terminal can then start the synchronization process to achieve synchronized control. Methods of terminal-terminal negotiation and verification are well known to those skilled in the art.

According to some embodiments, the result of a verification process is not a complete denial or allowance of a synchronization control request. Instead, part of a synchronization control request may be allowed and part denied. For example, the first terminal is allowed to control certain but not all aspects of the currently running multimedia application or a multimedia file which the currently running multimedia application can play and/or manage. In these embodiments, the server serves as a filter rather than a gate. This can be achieved by associating the identification information of the first terminal or the device on which the first terminal is installed, or the first terminal's login information, with different privileges/restrictions or different levels of privileges/restrictions. By way of example only, a particular first terminal identification, or a particular identification of the device on which a first terminal is installed, or a particular account logged in from the device on which the first terminal is installed, entitles the first terminal to control certain but not all aspects of the currently running multimedia application or a multimedia file which the currently running multimedia application can play and/or manage. In another example, only when the same account has been logged in from both the device on which the first terminal is installed and the device on which the second terminal is installed, will the first terminal be allowed to control all aspects of the currently running multimedia application or a multimedia file which the currently running multimedia application can play and/or manage, while the first terminal is allowed to control certain but not all aspects of the currently running multimedia application or a multimedia file which the currently running multimedia application can play and/or manage if the account logged in from the device on which the first terminal is installed is only within a same group account but different from the account logged in from the device on which the second terminal is installed, or if the account logged in from the device on which the first terminal is installed is only within a whitelist configured for the server but different from the account logged in from the device on which the second terminal is installed. Methods of associating accounts with different privileges/restrictions or different levels of privileges/restrictions and the principles to apply a filter on the server in accordance therewith are well known to those skilled in the art.

Step 107: the second terminal receives the synchronization control request and, in accordance with the one or more new playback attributes in the synchronization control request, controls the multimedia application.

As used herein, "controlling" a multimedia application means applying the one or more new playback attributes to the multimedia application or to one or more multimedia files which the multimedia application can play and/or manage. It can have various specific embodiments in accordance with the new playback attribute to be applied. For example, if a new playback attribute is a volume different from the current volume at which a multimedia file is being played, the second terminal applies the new volume to the playback of the multimedia file upon receiving the synchronization control request. If an old playback attribute is the title of a song in a library and the corresponding new playback attribute is a new title, then the second terminal replaces the old title of the song with the new title upon receiving the synchronization control request. If an old playback attribute is the status of a movie as being stored online and not locally, and the corresponding new playback attribute is a new status of the movie file as being stored locally, then the second terminal can initiate the downloading of that movie file and the storage of it locally upon receiving the synchronization control request. If an old playback attribute is the status of a movie the right to play which has not been paid for, and the corresponding new playback attribute is the status of the movie the right to play which has been paid for, then the second terminal can initiate the purchase of the right upon receiving the synchronization control request. If an old playback attribute is the existing viewers' or critics' comments on the movie (e.g., those left within the previous week or month in a certain forum or website), and the corresponding new playback attribute is a new comment, then the second terminal can post the new comment on the forum or website upon receiving the synchronization control request. Those skilled in the art are well aware of the methods of applying new playback attributes to a multimedia application or a multimedia file which the multimedia application can play and/or manage in accordance with the present disclosure.

Figure 2:
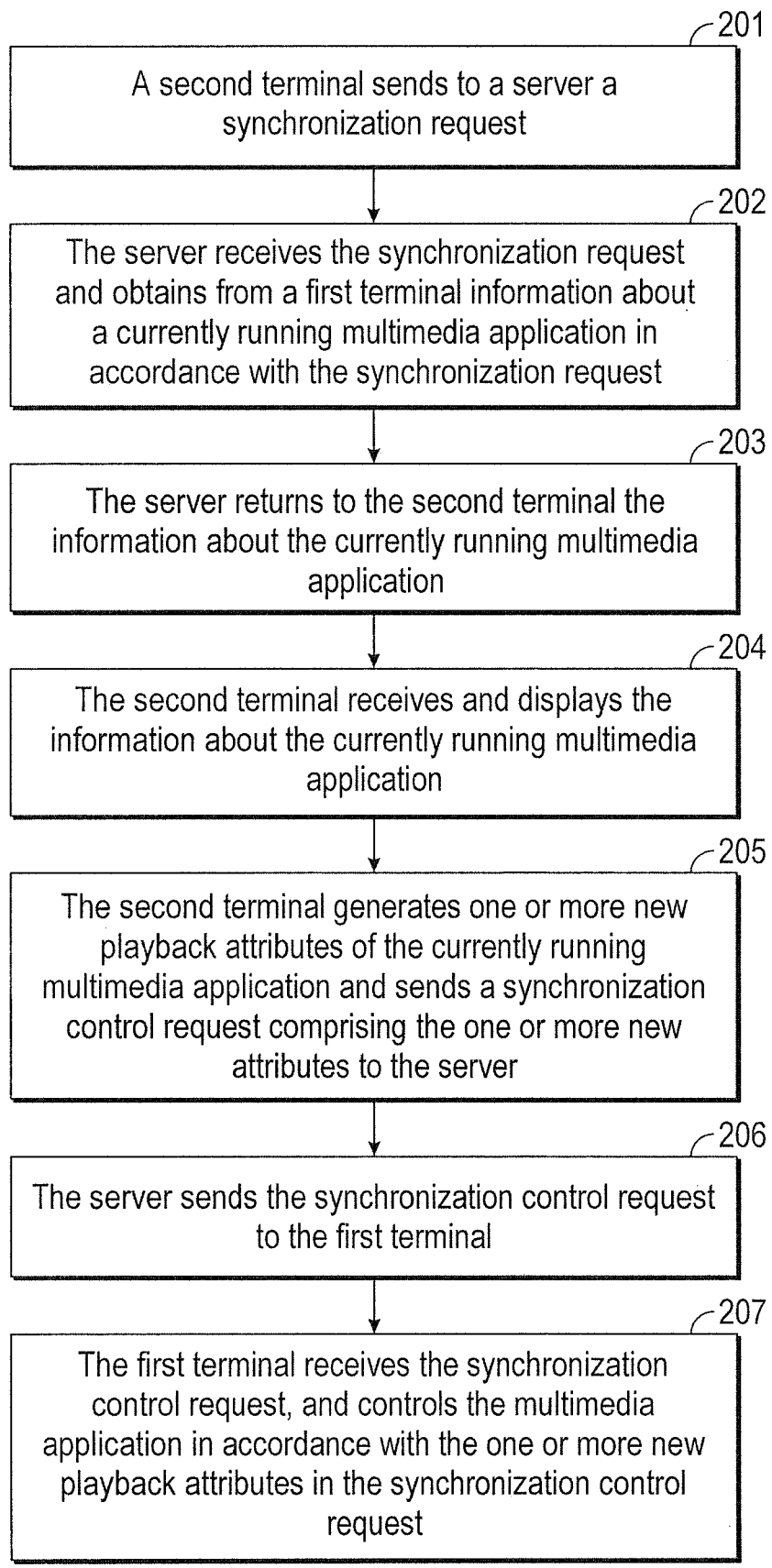
FIG. 2 is a flowchart illustrating an example of the flow of a terminal control method according to various embodiments.

The above process is described in terms of a first terminal, through synchronization through a server, controlling a multimedia application via a second terminal. According to some embodiments, reverse control is also possible, i.e., the second terminal can also synchronize control with the first terminal through a server and control another multimedia application via the first terminal. FIG. 2 is a schematic diagram illustrating an example of the flow of a reverse terminal control method according to various embodiments. The method can comprise the following steps.

Step 201: a second terminal sends a synchronization request to a server, the synchronization request configured to obtain information about a currently running multimedia application.

According to some embodiments, the server to which the second terminal sends the synchronization request is the same server as in the process described above. According to some other embodiments, the server to which the second terminal sends the synchronization request is different from the server in the process described above.

According to some embodiments, the currently running multimedia application the information about which the second terminal sends the synchronization request to obtain is the same as the multimedia application in the process described above. According to some other embodiments, the currently running multimedia application the information about which the second terminal sends the synchronization request to obtain is different from the multimedia application in the process described above. According to some embodiments, the currently running multimedia application the information about which the second terminal sends the synchronization request to obtain and the second terminal are installed on a same device. According to some other embodiments, the currently running multimedia application the information about which the second terminal sends the synchronization request to obtain and the second terminal are installed on different devices. According to some embodiments, the currently running multimedia application the information about which the second terminal sends the synchronization request to obtain and the first terminal are installed on a same device. According to some other embodiments, the currently running multimedia application the information about which the second terminal sends the synchronization request to obtain and the first terminal are installed on different devices. According to some embodiments, the currently running multimedia application the information about which the second terminal sends the synchronization request to obtain is the first terminal.

Step 202: the server receives the synchronization request and obtains from the first terminal the information about the currently running multimedia application in accordance with the synchronization request. Similar to step 102 described above, this step can additionally comprise a verification process, which has been described in detail hereinabove.

Step 203: the server sends to the second terminal the information about the currently running multimedia application.

Step 204: the second terminal receives and displays the information about the currently running multimedia application.

Step 205: the second terminal, based on one or more user commands, generates one or more new playback attributes of the currently running multimedia application, and sends to the server a synchronization control request comprising the one or more new playback attributes.

Step 206: the server sends the synchronization control request to the first terminal. Similar to step 106 described above, this step can additionally comprise a verification process, which has been described in detail hereinabove.

Step 207: the first terminal receives the synchronization control request and, in accordance with the one or more new playback attributes in the synchronization control request, controls the multimedia application.

A method of terminal control does not need to include all the steps in the process described above. As long as the first terminal (or the second terminal, as the case may be) has obtained the information about the currently running multimedia application, or the second terminal (or the first terminal, as the case may be) has sent the information about the currently running multimedia application generated by it, a method of terminal control may be considered completed. "Control of a terminal," as used herein, is to be therefore construed in a broad sense, i.e., it does not necessarily mean that a controlling device needs to change any playback attribute of the currently running multimedia application, but refers to the transfer of the information about a currently running multimedia application between terminals. According to some embodiments, a method of terminal control is completed when the first terminal (or the second terminal, as the case may be) displays the information about the currently running multimedia application, i.e., no user command is necessary and no new playback attribute of the currently running multimedia application is generated. Accordingly, no synchronization control request is sent and the running of the multimedia application is not changed or interrupted. By way of example only, when a first terminal (or a second terminal, as the case may be) displays the lyrics of a song currently being played by a multimedia player, the first terminal (or the second terminal, as the case may be) is considered to have controlled the playback of the song by the multimedia player. Similarly, when a first terminal (or a second terminal, as the case may be) displays the subtitle of a movie currently being played by a multimedia player, the first terminal (or the second terminal, as the case may be) is considered to have controlled the playback of the movie by the multimedia player. Sometimes, a user may only want to know what is being played by a multimedia player, or the multimedia player's playback history, and as long as that information is displayed by the first terminal (or the second terminal, as the case may be), the user is considered to have controlled the playback of the multimedia player, without inputting any further user command.

According to some embodiments, the information displayed by the first terminal (or the second terminal, as the case may be) is also displayed in real-time by the multimedia player. By way of example only, a first terminal (or a second terminal, as the case may be) may display the lyrics of a song (or the subtitles of a movie) when the same lyrics (or subtitles) are also being displayed, in real-time, by the currently running multimedia application, e.g., via a display device connected to the device on which the multimedia player is installed. According to some other embodiments, the information displayed by the first terminal (or the second terminal, as the case may be) is not displayed by the multimedia player. By way of example only, a first terminal (or a second terminal, as the case may be) may display the lyrics of a song (or the subtitles of a movie) when the currently running multimedia application does not display the lyrics (or the subtitles). Display of certain information about a currently running multimedia application by the first terminal (or the second terminal, as the case may be) only and not by the currently running multimedia application can be desirable in various situations. By way of example only, a user may find the display of the information by the currently running multimedia application interferes with her viewing experience (e.g., she only wants to know the title of a movie being played or to control the playback of the movie without having the title or any control button displayed on the movie screen and distract her from viewing the movie). Also by way of example only, a user may want to monitor the playback of a currently running multimedia application remotely without having the viewer of the content being played notice such monitoring, where the user herself is not the viewer.

The above describes methods of terminal control in example embodiments from the perspectives of both the controlling side and the controlled side, together with the server. Some of the example embodiments below describe the methods from the perspective of only one side, i.e., the interaction between one terminal and the server.

FIG. 5 is a schematic diagram illustrating an example of the flow of a terminal control method at the controlling side according to various embodiments. The method comprises the following steps.

Step 301: a first terminal receives from a server information about a currently running multimedia application, the information comprising application identification of the multimedia application and one or more playback attributes of the multimedia application. The multimedia application can comprise a media player. The playback attributes can comprise the current playback volume, the item currently being played, the current playback time of the item being played, and one or more items in a playlist.

Prior to step 301, the first terminal may send a synchronization request to the server, the synchronization request configured to obtain the information about the currently running multimedia application. According to some embodiments, the synchronization request can comprise the first terminal's account login information. According to some other embodiments, the synchronization request can comprise identification information of the first terminal or of the device on which the first terminal is installed.

According to some embodiments where the first terminal sends a synchronization request to the server, it is desirable to use a verification process to determine authority of the first terminal to obtain the information before successful synchronization of information about the multimedia application with the first terminal and the successful control of the multimedia application by the first terminal can be achieved. There are various methods to set up accounts and their relationships, and various principles to determine whether the account logged in from the device on which the first terminal is installed entitles the first terminal to obtain the information. Some of these methods and principles have been described in detail hereinabove. For example, if the verification criterion is that a same account has been logged in from both the device on which the first terminal is installed and the device on which a second terminal is installed, then prior to step 301, there can also be an additional step of logging in a first account from the device on which the first terminal is installed, wherein the first account is also the account logged in from the device on which the second terminal is installed. Other verification methods and criteria, including those described above (e.g., by using identification information of the first terminal or of the device on which the first terminal is installed, or by using a group account or a whitelist) are well known to those skilled in the art.

Step 302: the first terminal displays the information about the currently running multimedia application.

Step 303: the first terminal, based on one or more user commands, generates one or more new playback attributes of the currently running multimedia application, and sends to a second terminal via the server a synchronization control request comprising the one or more new playback attributes, thereby allowing the second terminal, in accordance with the one or more new playback attributes in the synchronization control request, to control the multimedia application.

According to some embodiments, the synchronization process need not be initiated by the first terminal, i.e., the first terminal need not send a request to obtain the information first. Instead, the information can be sent to the first terminal from the server in the absence of any request from the first terminal. This is desirable in situations where a user would like to use the first terminal to not only control the multimedia application but also to monitor the running of the multimedia application, either periodically or when one or more of its playback attributes have changed. By way of example only, a server can send information about a currently running multimedia application to the first terminal from time to time at either pre-determined or customizable intervals. Upon receipt of the information, the first terminal can display the information thereby allowing a user to control the multimedia application.

FIG. 6 is a schematic diagram illustrating an example of the flow of a terminal control method at the controlled side according to various embodiments. The method comprises the following steps.

Step 401: generating information about a currently running multimedia application, the information comprising the application identification of the multimedia application and one or more playback attributes of the multimedia application. The playback attributes can comprise the current playback volume, the item currently being played, the current playback time of the item being played, and one or more items in a playlist.

Step 402: sending the information about the currently running multimedia application to a first terminal via a server, thereby allowing the first terminal to generate and return via the server one or more new playback attributes of the currently running multimedia application. According to some embodiments, the generated one or more new playback attributes were generated in accordance with one or more user commands.

Step 403: receiving a synchronization control request sent from the server, wherein the synchronization control request comprises the one or more new playback attributes of the currently running multimedia application.

Step 404: controlling the currently running multimedia application in accordance with the one or more new playback attributes in the synchronization control request.

According to some embodiments, generating the information about the currently running multimedia application is in response to a synchronization request from the server to obtain the information. In these embodiments, accordingly, the method should further comprise the following step prior to generating the information about the currently running multimedia application: receiving from the server a synchronization request to obtain the information about the currently running multimedia application, wherein generating the information about the currently running multimedia application is in accordance with the synchronization request.

According to some other embodiments, generating the information about the currently running multimedia application is not in response to any synchronization request, but can happen from time to time at either pre-determined or customizable intervals. This is desirable when frequent or periodic monitoring of the running of the multimedia application is intended, because it obviates the need for frequent or periodic synchronization requests.

According to some embodiments, a first terminal can obtain relevant information about a multimedia application currently running on a device on which a second terminal is installed and display the information on the first terminal, thereby allowing a user to observe the multimedia application running status on the device on which the second terminal is installed from the first terminal. Compared to existing TV remote controls, the remote control that can be achieved using the first terminal can have much richer control functionalities.

According to some embodiments, a first terminal can generate a control command corresponding to information obtained from a second terminal, and send a request to the second terminal, thereby controlling the running of a multimedia application installed on the device on which the second terminal is installed. The connection between the first terminal and the server and the connection between the second terminal and the server can each be via the Internet, a local area network, or any other method connecting a terminal to a server, which methods are well known to those skilled in the art. Regardless of the method of connection, the present disclosure achieves the control of a multimedia application via a terminal installed on a different device, i.e., the control of one device's multimedia application can be transferred to another device. Different choices of the controlling device on which the first terminal can be installed result in the convenience and flexibility of remotely controlling the multimedia application.

For example, according to some embodiments, when the first terminal is installed on a mobile terminal device (e.g., a mobile phone or a tablet PC), and the second terminal is installed on a terminal device with multimedia playback functions (e.g., a desktop computer or a smart TV), because of the mobility of the mobile terminal device and the visibility of the application information on it, users can conveniently enjoy the versatility of different methods of control, as long as the network environment allows it. For example, a user can control what is being played on a home TV from the office or on the road, at any time. This is especially useful for families with minor children, who are not supposed to watch certain multimedia files on TV or in their computers. As mobile terminal devices are being smarter and smarter nowadays, it has become very easy to configure a client-side application to achieve the remote control according to the present disclosure, without the need to modify any hardware (e.g., to program a TV remote control), or to significantly increase the client part of a mobile terminal device, in order to achieve rich remote control functionalities.

According to some embodiments, the control between a first terminal and a second terminal can be reciprocal, i.e. the first terminal can control a multimedia application via the second terminal, and the second terminal can also control another, or the same, multimedia application via the first terminal. In some embodiments, a multimedia application and a terminal via which another terminal remotely controls the multimedia application are installed on a same device. In some other embodiments, the multimedia application and the terminal via which another terminal remotely controls the multimedia application are installed on separate devices.

Figure 7:
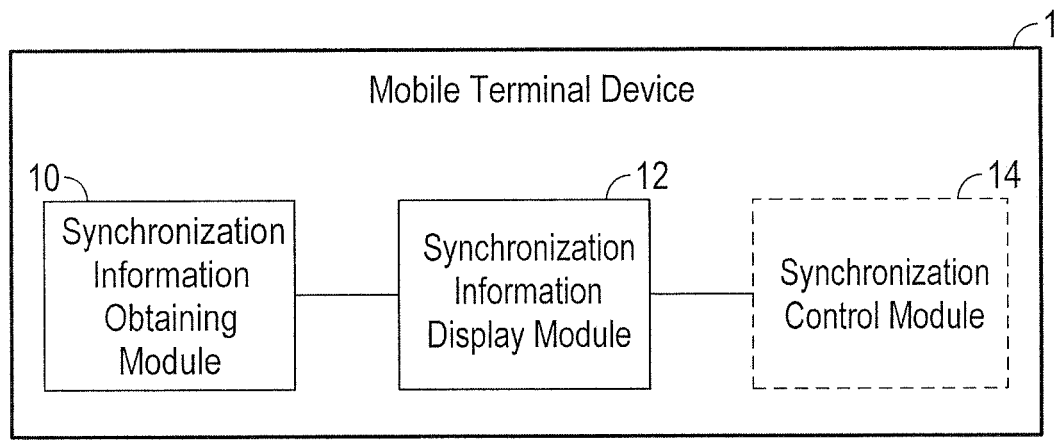
FIG. 7 is a system diagram illustrating examples of arrangements of a mobile terminal device according to various embodiments.

FIG. 7 is a system diagram illustrating examples of arrangements of a mobile terminal device according to various embodiments. Examples of the mobile terminal device include, but are not limited to, a smart phone and a tablet PC. The mobile terminal device 1 comprises: a synchronization information obtaining module 10, configured to request and obtain from a server information about a currently running multimedia application, the information comprising application identification of the multimedia application and one or more playback attributes of the multimedia application; and a synchronization information display module 12, configured to display the information about the currently running multimedia application. Optionally, the mobile terminal device additionally comprises a synchronization control module 14, configured to generate one or more new playback attributes of the currently running multimedia application in accordance with one or more user commands, and to send a synchronization control request comprising the one or more new playback attributes to a second terminal via the server, thereby allowing the second terminal to control the currently running multimedia application in accordance with the one or more new playback attributes in the synchronization control request. The multimedia application can comprise a media player. The playback attributes can comprise the current playback volume, the item currently being played, the current playback time of the item being played, and one or more items in a playlist.

The mobile terminal device can additionally comprise a login module configured to log in a corresponding account. When the mobile terminal device sends a request to a server to synchronize the information about a currently running multimedia application, the request can carry the account login information, whereby the server can verify, based on the account login information, whether the mobile terminal device has authority to synchronize the information about the currently running multimedia application.

The terminal device as described above does not have to be a mobile terminal device. According to some embodiments, the terminal and the second terminal are installed on a same device. According to some other embodiments, the terminal and the second terminal are installed on different devices. According to some embodiments, the second terminal and the currently running multimedia application are installed on a same device. According to some other embodiments, the second terminal and the currently running multimedia application are installed on different devices. According to some embodiments, the second terminal is the currently running multimedia application.

Figure 8:
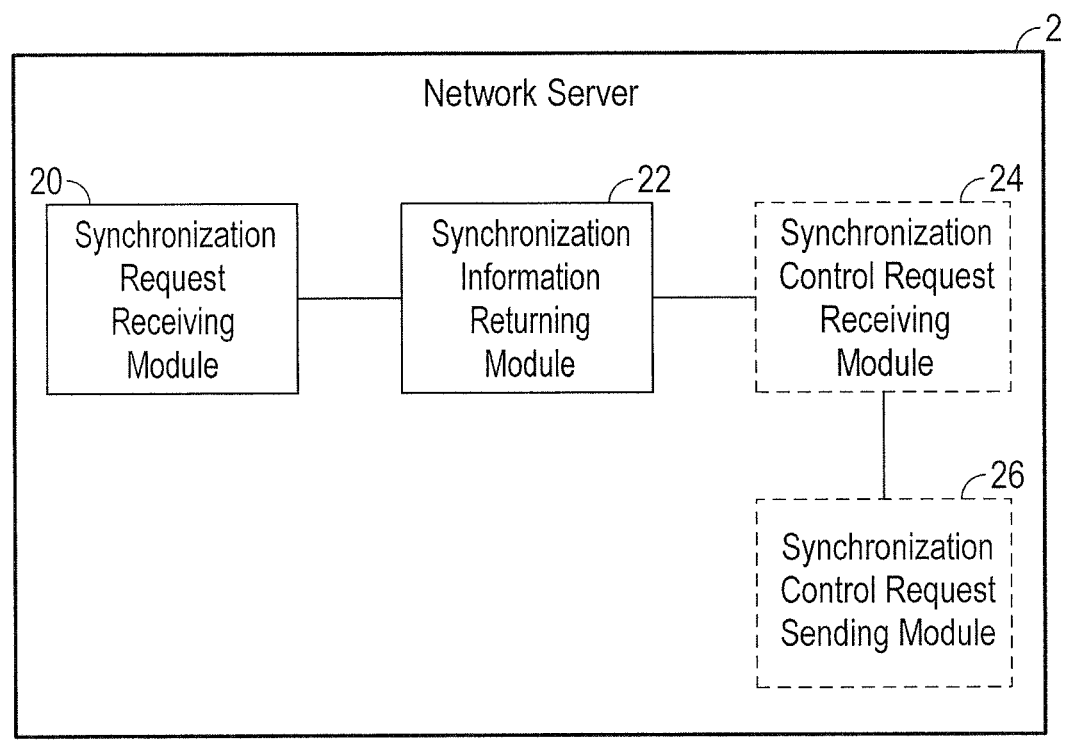
FIG. 8 is a system diagram illustrating examples of arrangements of a network server according to various embodiments.

FIG. 8 is a system diagram illustrating examples of arrangements of a network server according to various embodiments. The network server 2 comprises: a synchronization request receiving module 20, configured to receive a synchronization request sent from a first terminal, the synchronization request being configured to obtain information about a currently running multimedia application, the information comprising application identification of the multimedia application and one or more playback attributes of the multimedia application; and a synchronization information returning module 22, configured to obtain from a second terminal the information about the currently running multimedia application in accordance with the synchronization request, and to send to the first terminal the information about the currently running multimedia application. Optionally, the network server additionally comprises: a synchronization control request receiving module 24, configured to receive a synchronization control request comprising one or more new playback attributes of the currently running multimedia application generated by and sent from the first terminal in accordance with the information about the currently running multimedia application and with one or more user commands; and a synchronization control request sending module 26, configured to send to the second terminal the synchronization control request comprising the one or more new playback attributes, thereby allowing the second terminal to control the multimedia application in accordance with the one or more new playback attributes in the synchronization control request.

According to some embodiments, the first terminal and the second terminal are installed on a same device. According to some other embodiments, the first terminal and the second terminal are installed on different devices.

Figure 9A:
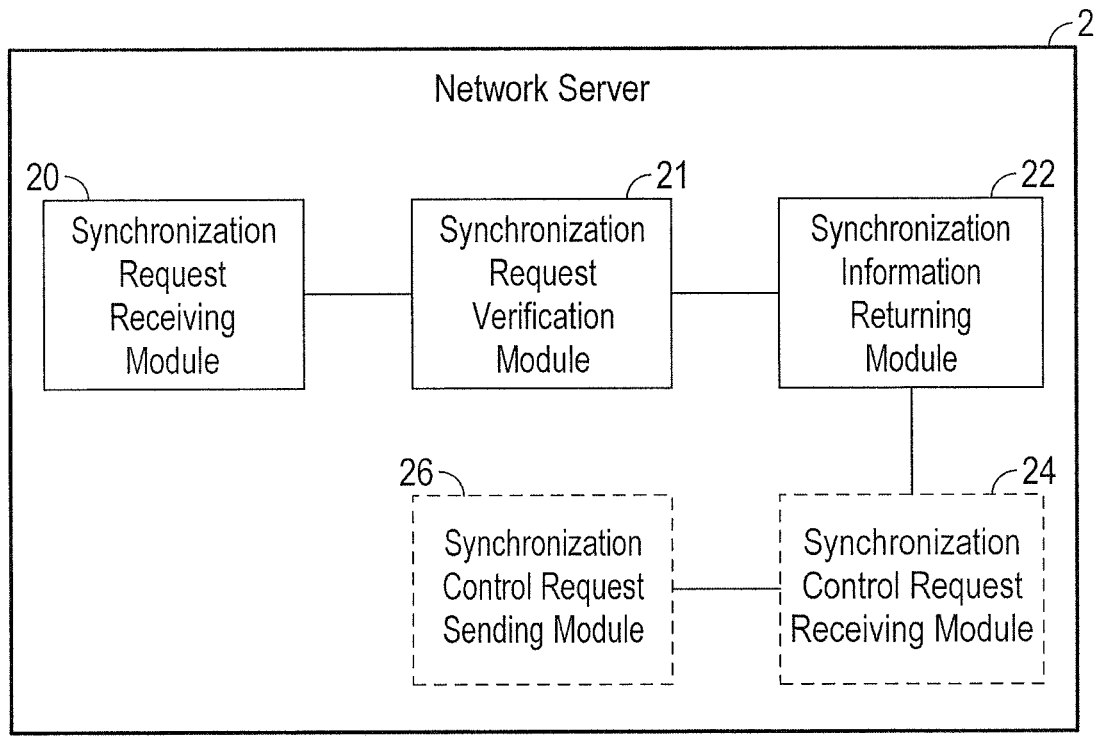
FIGS. 9A-9B are system diagrams illustrating examples of arrangements of a network server according to various embodiments.

According to some embodiments, the synchronization request can additionally comprise the first terminal's account login information or identification information of the first terminal or the device on which the first terminal is installed. As shown in FIG. 9A, the network server 2 as illustrated in FIG. 8 can further comprise: a synchronization request verification module 21, configured to verify, in accordance with the synchronization request, whether the first terminal has authority to obtain the information about the currently running multimedia application. When and only when the result of the verification is positive, the synchronization information returning module 22 is started and obtains from the second terminal the information about the currently running multimedia application. Alternatively, the synchronization information returning module 22 can obtain the information about the currently running multimedia application first but when and only when the result of the verification is positive, does it send the information to the first terminal. The multimedia application can comprise a media player. The playback attributes can comprise the current playback volume, the item currently being played, the current playback time of the item being played, and one or more items in a playlist.

Figure 9B:
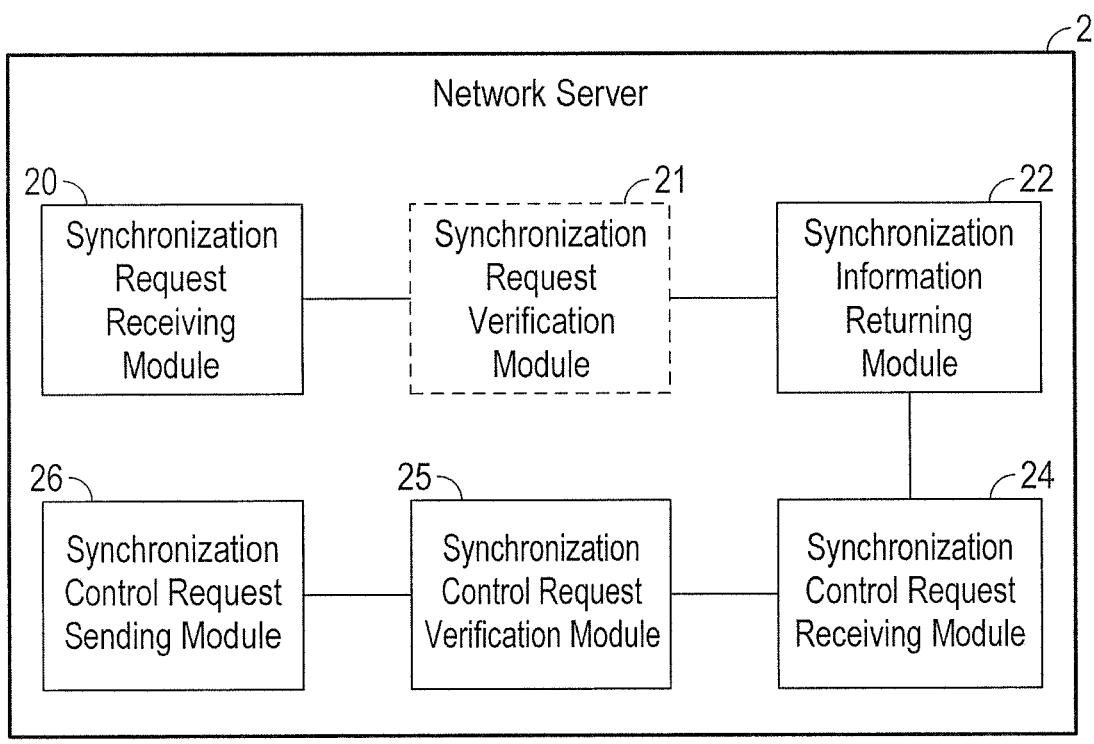

According to some embodiments, the synchronization control request can additionally comprise the first terminal's account login information or identification information of the first terminal or the device on which the first terminal is installed. As shown in FIG. 9B, the network server 2 illustrated in FIG. 8 or FIG. 9A can further comprise: a synchronization control request verification module 25, configured to verify, in accordance with the synchronization control request, whether the first terminal has authority to control the currently running multimedia application. When and only when the result of the verification is positive, the synchronization control request sending module 26 is started and requests to obtain from the second terminal the information about the currently running multimedia application. The multimedia application can comprise a media player. The playback attributes can comprise the current playback volume, the item currently being played, the current playback time of the item being played, and one or more items in a playlist.

According to some embodiments, a network server can comprise both a synchronization request verification module, configured to verify, in accordance with the synchronization request, whether the first terminal has authority to obtain the information about the currently running multimedia application, and a synchronization control request verification module, configured to verify, in accordance with the synchronization control request, whether the first terminal has authority to control the currently running multimedia application. Even if the same information from the first terminal for verification, e.g., the first terminal's account login information or identification information of the first terminal or the device on which the first terminal is installed, is present in both the synchronization request and the synchronization control request, the results of the verification by the synchronization request verification module and the synchronization control request verification module can be different. That is, the synchronization request verification module and the synchronization control request verification module can apply different standards and grant different privileges or impose different restrictions in their respective verification processes. By way of examples only, a device identification of the device on which a first terminal is installed can entitle the first terminal to only obtain and display the information about a currently running multimedia application and not to control the multimedia application. Or, an account logged in from the device on which a first terminal is installed can entitle the first terminal to obtain and display all the information about a currently running multimedia application but to control only a subset and not all the aspects of the multimedia application or a file which the multimedia application can play and/or manage.

According to some embodiments, both the synchronization request verification module and the synchronization control request verification module serve as gates, in that they can only grant or deny authority to the first terminal in toto. According to some other embodiments, both the synchronization request verification module and the synchronization control request verification module serve as filters, in that they can each grant or deny partial authority to the first terminal, e.g., by allowing some part but not other parts of a synchronization request, or by allowing some part but not other parts of a synchronization control request. According to yet some other embodiments, the synchronization request verification module is a gate and the synchronization control request verification module is a filter. According to still some other embodiments, the synchronization request verification module is a filter and the synchronization control request verification module is a gate.

According to some embodiments, the second terminal and the currently running multimedia application are installed on a same device. According to some other embodiments, the second terminal and the currently running multimedia application are installed on different devices. According to some embodiments, the second terminal is the currently running multimedia application.

Figure 10:
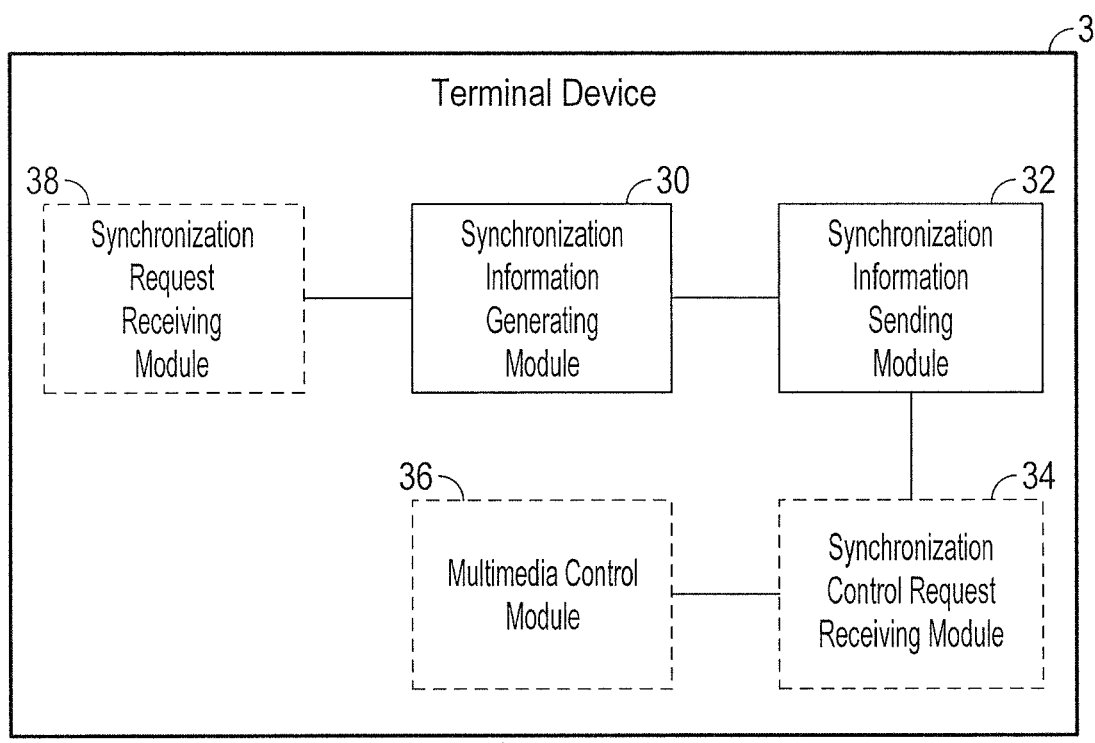
FIG. 10 is a system diagram illustrating examples of arrangements of a terminal device according to various embodiments.

FIG. 10 is a system diagram illustrating examples of arrangements of a terminal device according to various embodiments. The terminal device 3 comprises: a synchronization information generating module 30, configured to generate information about a currently running multimedia application, the information comprising application identification of the multimedia application and one or more playback attributes of the multimedia application; and a synchronization information sending module 32, configured to send the information to another terminal via a server. Optionally, the terminal device can also comprise: a synchronization request receiving module 38, configured to receive from the server a synchronization request to obtain the information. According to these embodiments, the synchronization information generating module 30 is configured to generate the information about the currently running multimedia application in accordance with the synchronization request. Optionally, in addition to synchronization information generating module 30 and synchronization information sending module 32, the terminal device can comprise: a synchronization control request receiving module 34, configured to receive from the server a synchronization control request comprising one or more new playback attributes of the currently running multimedia application; and a multimedia control module 36, configured to control the multimedia application in accordance with the one or more new playback attributes in the synchronization control request. Optionally, in addition to synchronization information generating module 30 and synchronization information sending module 32, the terminal device can comprise: a synchronization request receiving module 38, configured to receive from the server a synchronization request to obtain the information; a synchronization control request receiving module 34, configured to receive from the server a synchronization control request comprising one or more new playback attributes of the currently running multimedia application; and a multimedia control module 36, configured to control the multimedia application in accordance with the one or more new playback attributes in the synchronization control request. According to these embodiments, the synchronization information generating module 30 is configured to generate the information about the currently running multimedia application in accordance with the synchronization request. The multimedia application can comprise a media player. According to some embodiments, the playback attributes can comprise the current playback volume, the item currently being played, the current playback time of the item being played, and one or more items in a playlist. Accordingly, the multimedia control module 36 can be configured to control a media player to adjust current playback volume, change the item currently being played, change the current playback time of the item being played, and select one or more items in a playlist.

According to some embodiments, the terminal and the other terminal are installed on a same device. According to some other embodiments, the terminal and the other terminal are installed on different devices. According to some embodiments, the terminal and the currently running multimedia application are installed on a same device. According to some other embodiments, the terminal and the currently running multimedia application are installed on different devices. According to some embodiments, the terminal is the currently running multimedia application.

The terms and functions referred to when describing the above terminal devices and network servers have their same respective meanings as discussed hereinabove. Those skilled in the art will readily appreciate that the terminal device can be either a mobile terminal device or a non-mobile terminal device. For example, according to some embodiments, a mobile terminal device can control another mobile terminal device. In some other embodiments, a non-mobile terminal device can control another non-mobile terminal device. In yet some other embodiments, a mobile terminal device can control a non-mobile terminal device. In still some other embodiments, a non-mobile terminal device can control a mobile terminal device.

Figure 11A:
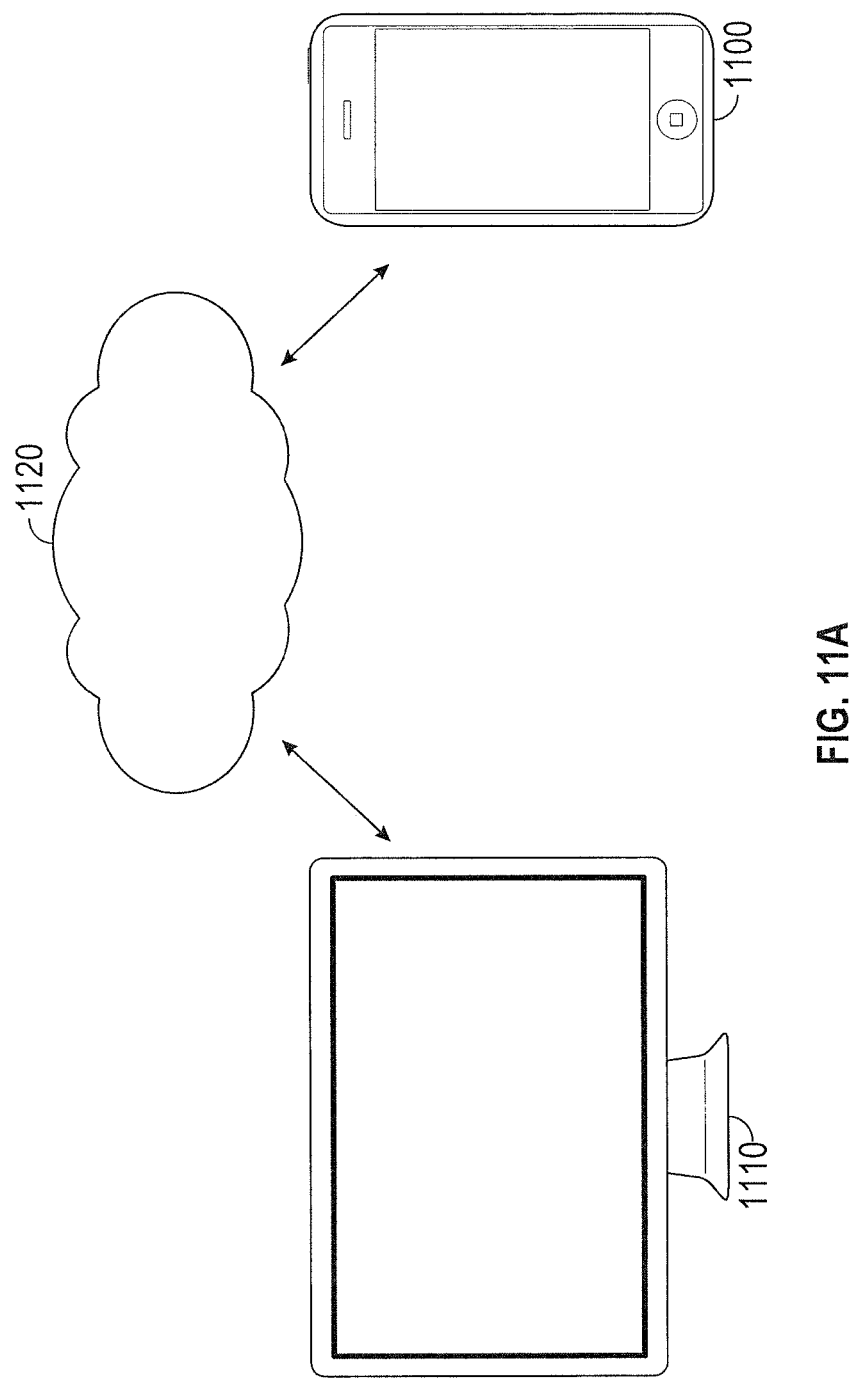
FIG. 11A is a system diagram illustrating an example system according to various embodiments.
Figure 11B:
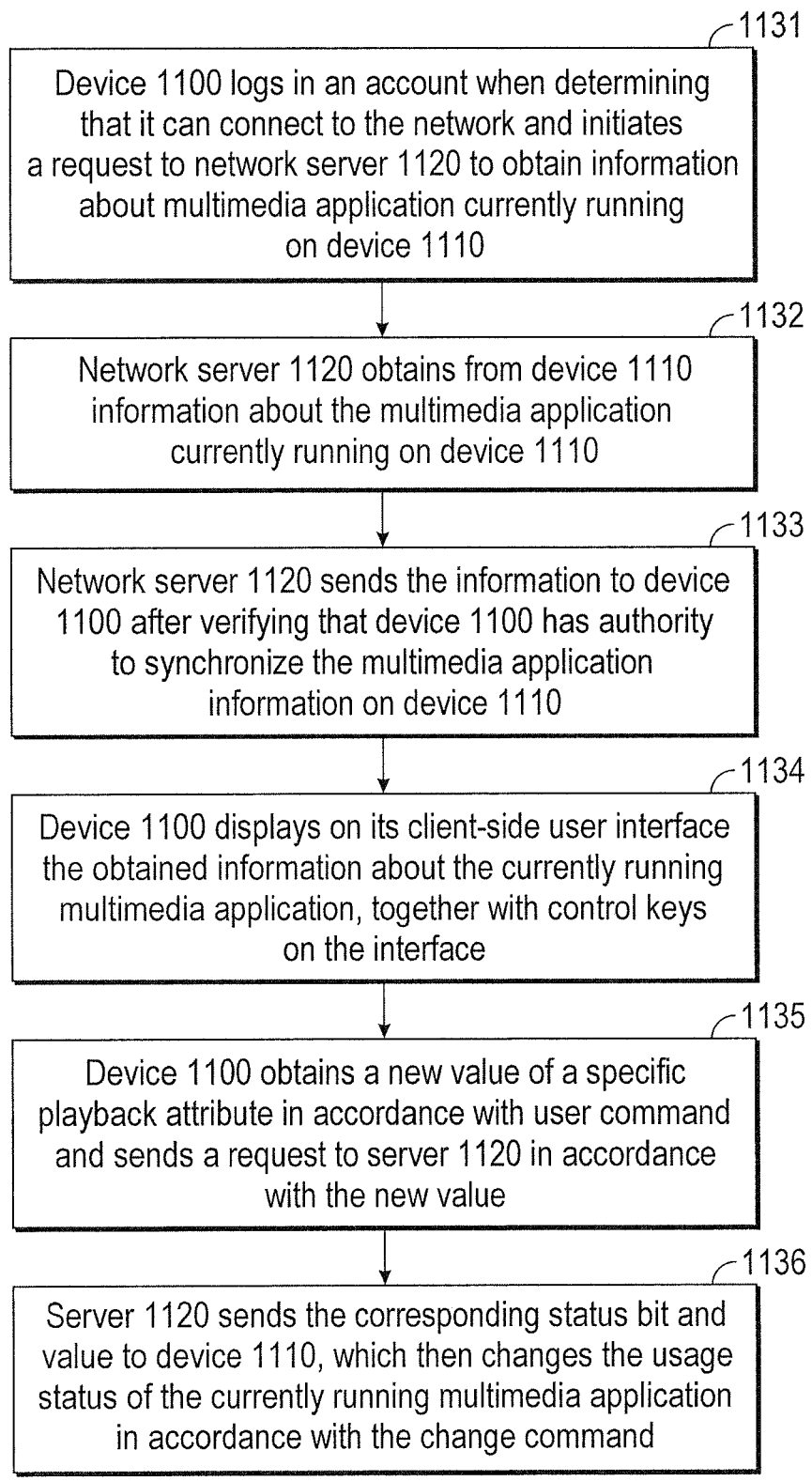
FIG. 11B is a flowchart illustrating an example of the flow of processes each of the terminals and the server in FIG. 11A executes according to various embodiments.

FIG. 11A is a system diagram illustrating an example system according to various embodiments. As illustrated in FIG. 11A, devices 1100 and 1110 can be both connected to a network server 1120 via a network. FIG. 11B is a flowchart illustrating an example of the flow of processes each of the terminals and the server in FIG. 11A executes according to various embodiments.

According to these particular embodiments, the applications in both device 1100 and device 1110 have account login function. It should be noted that there is no limitation to any specific type of terminal device 1100 and device 1110 can each be, nor any specific type of connection or method by which device 1100 and device 1110 are connected to the network. In this particular example, the embodiment of the device on which the first terminal is installed (device 1100) is a mobile terminal device, e.g., a mobile phone, and the embodiment of the device on which the second terminal is installed (device 1110) is a PC. The mobile phone can connect to the Internet wirelessly and the PC can connect to the Internet via wired connection. The network server in this embodiment can be a server providing relevant services on the Internet.

As illustrated in FIG. 11B, the process is as follows:

Step 1131: a user turns on device 1100, which logs in an account when determining that it can connect to the network, and initiates a request to a network server 1120 to obtain information about multimedia application currently running on device 1110.

Step 1132: after receiving the request, network server 1120 obtains from the device 1110 information about the multimedia software currently in running on device 1110, including name of the software and properties of software usage. By way of example only, in the case of a music playing application, such properties of software usage can comprise playlist of songs, title of the song currently being played, current volume and playback status, etc.

Step 1133: network server 1120 then sends the information to device 1100. In this particular embodiment, in the synchronization process, network server 1120 verifies whether device 1100 has authority to synchronize the multimedia application information on device 1110. Methods of such verification have been described in detail hereinabove and are well known to those skilled in the art. For example, network server 1120 can verify whether device 1100 and device 1110 have logged into a same account and, if so, determine that device 1100 has authority to synchronize the multimedia application information on device 1110 and proceed with the synchronization. The specific verification principle can be configured on the server 1120 based on the actual need and methods of such configuration are well known to those skilled in the art.

Step 1134: device 1100 displays on its client-side user interface the obtained information about the currently running multimedia application, together with control keys on the interface. As shown in FIG. 3 (which illustrates an example of synchronizing music playback information between a first terminal and a second terminal according to various embodiments), a mobile phone displays on its user interface a music playlist on a computer, and a user of the mobile phone can quickly switch between songs and control the playback, pause, volume, and progress of the music on the computer via buttons on the interface. As shown in FIG. 4 (which illustrates an example of synchronizing video playback information between a first terminal and a second terminal according to various embodiments), a mobile phone displays on its user interface a movie playlist on a computer, and a user of the mobile phone can quickly switch between movies and control the playback, pause, volume, and progress of the movie on the computer via buttons on the interface.

Step 1135: when the user triggers a specific control command by, e.g., pressing a specific key on device 1100, device 1100 obtains the corresponding user command and obtains a new value of a specific playback attribute in accordance with the user command. For example, if the user command is to switch to a new music item, then device 1100 can generate a status bit for the attribute and a changed attribute value group package and sends a request to server 1120.

Step 1136: after receiving the request, server 1120 can send the corresponding status bit and value to device 1110, which then changes the usage status of the currently running multimedia application in accordance with the change command, thereby accomplishing the control by device 1100.

The above examples of processes and devices are described in terms of a terminal, through synchronization through a server, controlling a multimedia application via another terminal. According to some other embodiments, a terminal can control a multimedia application via another terminal in the absence of a server. This can be achieved, e.g., when the terminals are both in a local area network, e.g., a WiFi network, or are directly connected to each other via such connections as Bluetooth, infrared, or near field communication.

Figure 12:
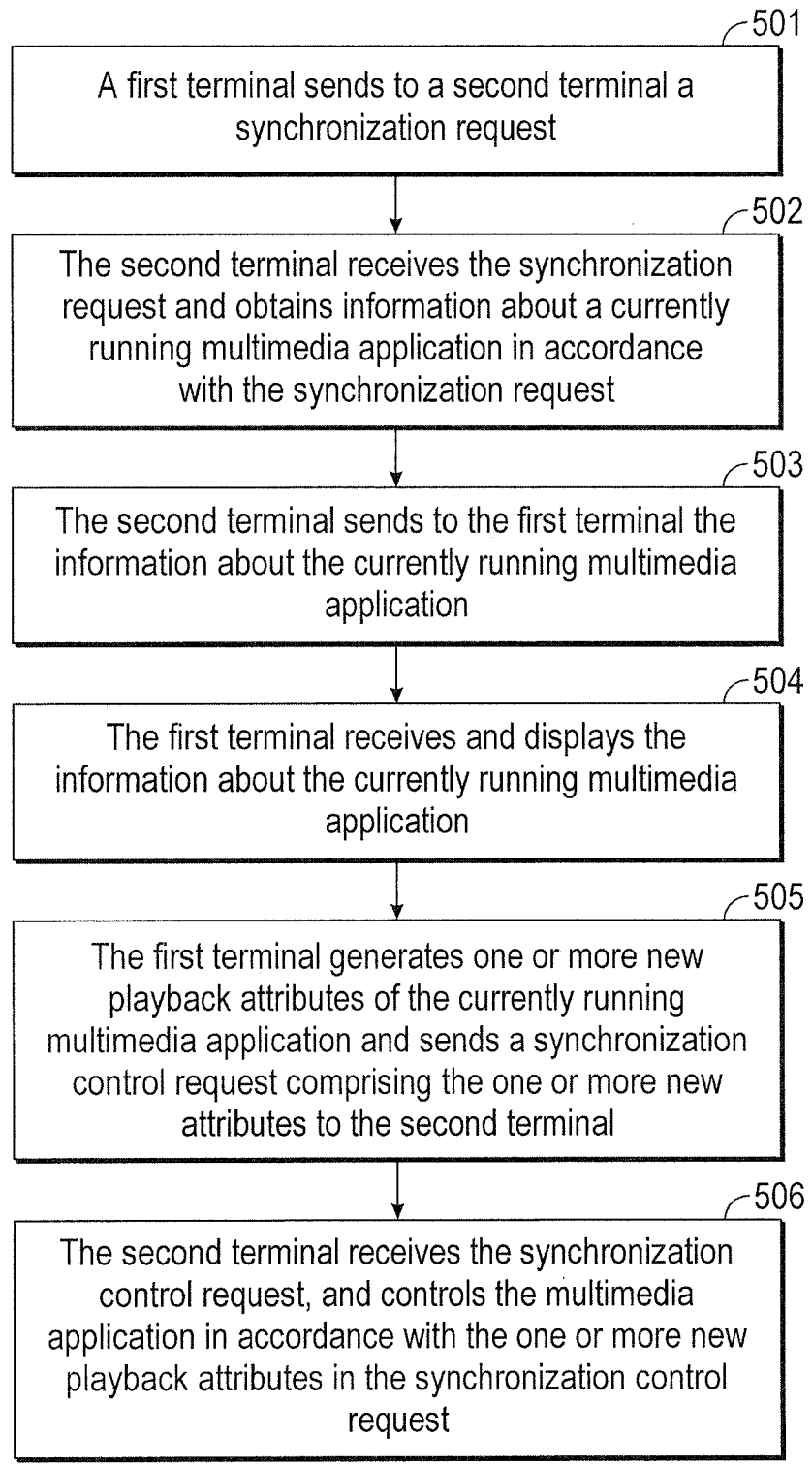
FIG. 12 is a flowchart illustrating an example of the flow of a terminal control method according to various embodiments.

FIG. 12 is a schematic diagram illustrating an example of the flow of a terminal control method according to various embodiments. The method can comprise the following steps.

Step 501: a first terminal sends a synchronization request to a second terminal, the synchronization request configured to obtain information about a currently running multimedia application, and the information comprising the application identification of the multimedia application and one or more playback attributes of the multimedia application.

According to some embodiments, the first terminal can be an application installed on a mobile device or a non-mobile device. According to some embodiments, the first terminal and the currently running multimedia application are installed on a same device. According to some other embodiments, the first terminal and the currently running multimedia application are installed on different devices.

According to some embodiments, the first terminal can itself be a multimedia application. According to some other embodiments, the first terminal can be an application other than a multimedia application regardless of whether the device on which the first terminal is installed has a multimedia application or not.

Step 502: the second terminal receives the synchronization request and obtains the information about the currently running multimedia application in accordance with the synchronization request.

According to some embodiments, the second terminal can be an application installed on a mobile device or a non-mobile device. According to some embodiments, the first terminal and the second terminal are installed on a same device. According to some other embodiments, the first terminal and the second terminal are installed on different devices. According to some embodiments, the second terminal and the currently running application are installed on a same device. According to some other embodiments, the second terminal and the currently running application are installed on different devices. Accordingly, in various embodiments, a synchronization request can be configured to obtain the information about a multimedia application currently running on a specific device, for example, on the device on which the second terminal is installed, or on another device different from the device on which the second terminal is installed.

According to some embodiments, the second terminal can itself be a multimedia application. According to some other embodiments, the second terminal can be an application other than a multimedia application regardless of whether the device on which the second terminal is installed has a multimedia application or not, as long as the second terminal has authority to obtain the information about the currently running multimedia application, while also having the capability to send control information to the currently running multimedia application and to control it. According to some embodiments, the second terminal is the currently running multimedia application.

According to some embodiments, the first terminal can have account login function. According to some other embodiments, the second terminal can have account login function.

According to some embodiments, the first terminal and the second terminal are synchronized only after a verification process. According to some other embodiments, a verification process is available but optional. A verification process provides an opportunity to deny the synchronization request from a controlling device if the controlling device does not meet one or more criteria. Therefore, the verification process can add an additional layer of security in that even if a user has obtained access to a controlling device, she still cannot effect control over the controlled device unless and until the controlling device has met the one or more criteria. According to some embodiments, the verification criteria can comprise identification information of the first terminal or the device on which the first terminal is installed. According to some other embodiments, the verification criteria can comprise the first terminal's account login information.

According to some embodiments, a synchronization request can comprise identification information of the first terminal or the device on which the first terminal is installed. According to these embodiments, in the process of obtaining from the second terminal the information about the currently running multimedia application, the second terminal can verify whether the identification information of the first terminal or the device on which the first terminal is installed entitles the first terminal to obtain the information about the currently running multimedia application, and obtain the information about the currently running multimedia application when and only when the verification result is positive.

According to some other embodiments, a synchronization request can comprise the first terminal's account login information. In these embodiments, in the process of obtaining from the second terminal the information about the currently running multimedia application, the second terminal can verify whether the account logged in from the device on which the first terminal is installed has authority to obtain the information about the currently running multimedia application, and obtain the information about the currently running multimedia application when and only when the verification result is positive.

An example verification process by a second terminal based on identification information can be as follows: when the synchronization request comprises identification information of the first terminal or of the device on which the first terminal is installed, the second terminal receives the synchronization request and, in accordance with the synchronization request, verifies whether the identification information matches information stored on the device on which the second terminal is installed or is within a whitelist configured for the device on which the second terminal is installed. When and only when the result of the verification is positive, the second terminal obtains the information about the currently running multimedia application.

An example verification process by a second terminal based on a first terminal's account login information can be as follows: when the synchronization request comprises the first terminal's account login information, the second terminal receives the synchronization request and, in accordance with the synchronization request, verifies whether the account logged in from the device on which the first terminal is installed entitles the first terminal to obtain the information about the currently running multimedia application. When and only when the verification result is positive, the second terminal obtains the information about the currently running multimedia application.

The account login information can include single account login information or group account login information. In some example embodiments, if the first terminal and the second terminal are applications separately installed on two physically separate devices, a user can log in account A on a device on which the first terminal is installed and can also log in account A on a device on which the second terminal is installed. If account A is a single account, then during the verification process, the second terminal will know that the same account has been logged in using both the first terminal and the second terminal. In some other example embodiments, a user can log in account a1 one a device on which the first terminal is installed, and log in account a2 on a device on which the second terminal is installed. If accounts a1 and a2 belong to a same group account A, then during the verification process, the second terminal will know that both the first terminal and the second terminal have been used to log in accounts belonging to the same group account A.

In accordance with the various methods to set up accounts, the second terminal can employ various principles to determine whether an account logged in from a device on which a first terminal is installed entitles the first terminal to obtain the information about the currently running multimedia application. By way of examples only, when the account logged in from the device on which the first terminal is installed is the same as the account logged in from the device on which the second terminal is installed, the second terminal can determine that the first terminal has authority to obtain the information. Or, when the account logged in from the device on which the first terminal is installed and the account logged in from the device on which the second terminal is installed belong to a same group account, the second terminal can determine that the first terminal has authority to obtain the information. Or, when the account logged in from the device on which the first terminal is installed is an account within a specific whitelist configured for the second terminal, the second terminal can determine that the first terminal has authority to obtain the information. These principles and how to apply these principles to achieve account verification are well known to those skilled in the art.

Of course, the verification process does not have to be carried out after the second server receives a synchronization request. Instead, the first terminal and the second terminal can complete the verification process through prior negotiation. After the verification is completed, the first terminal or the second terminal can then start the synchronization process to achieve synchronized control. Methods of terminal-terminal negotiation and verification are well known to those skilled in the art.

According to some embodiments, the result of a verification process is not a complete denial or allowance of a synchronization request. Instead, part of a synchronization request may be allowed and part denied. For example, the first terminal is allowed to obtain certain but not other information about the currently running multimedia application. In these embodiments, the second terminal serves as a filter rather than a gate. This can be achieved by associating the identification information of the first terminal or the device on which the first terminal is installed, or the first terminal's login information, with different privileges/restrictions or different levels of privileges/restrictions. By way of example only, a particular first terminal identification, or a particular identification of the device on which a first terminal is installed, or a particular account logged in from the device on which the first terminal is installed, entitle the first terminal to obtain certain but not other information about the currently running multimedia application. In another example, only when the same account has been logged in from both the device on which the first terminal is installed and the device on which the second terminal is installed, will the first terminal be allowed to obtain all information about the currently running multimedia application, while the first terminal is allowed to obtain only some but not other information about the currently running multimedia application if the account logged in from the device on which the first terminal is installed is only within a same group account but different from the account logged in from the device on which the second terminal is installed, or if the account logged in from the device on which the first terminal is installed is only within a whitelist configured for the second terminal but different from the account logged in from the device on which the second terminal is installed. Methods of associating accounts with different privileges/restrictions or different levels of privileges/restrictions and the principles to apply a filter on the second terminal in accordance therewith are well known to those skilled in the art.

Step 503: the second terminal sends to the first terminal the information about the currently running multimedia application.

Step 504: the first terminal receives and displays the information about the currently running multimedia application.

Step 505: the first terminal, based on one or more user commands, generates one or more new playback attributes of the currently running multimedia application, and sends to the second terminal a synchronization control request comprising the one or more new playback attributes. In this step, the first terminal typically generates a new playback attribute based on a user's trigger, and the new playback attribute constitutes a control command, setting a playback attribute different from the prior playback attribute. For example, a new playback attribute comprises a volume different from the volume in the prior playback attribute.

Step 506: the second terminal receives the synchronization control request and, in accordance with the one or more new playback attributes in the synchronization control request, controls the multimedia application.

According to some embodiments, the first terminal can control the currently running multimedia application only after a verification process, even though the first terminal can obtain and display information about the currently running multimedia application. According to some other embodiments, such a verification process is available but optional. Such a verification process provides an opportunity to deny the synchronization control request from a controlling device if the controlling device does not meet one or more criteria. Therefore, the verification process can add an additional layer of security in that even if a user has obtained access to a controlling device and the information about the currently running multimedia application, she still cannot control the controlled device unless and until the controlling device has met the one or more criteria. According to some embodiments, the verification criteria can comprise identification information of the first terminal or the device on which the first terminal is installed. According to some other embodiments, the verification criteria can comprise the first terminal's account login information.

According to some embodiments, a synchronization control request can comprise identification information of the first terminal or the device on which the first terminal is installed. According to these embodiments, in the process of receiving the synchronization control request from the first terminal, the second terminal can verify whether the identification information of the first terminal or the device on which the first terminal is installed entitles the first terminal to control the currently running multimedia application, and controls the currently running multimedia application in accordance with the one or more new playback attributes in the synchronization control request when and only when the verification result is positive.

According to some other embodiments, a synchronization control request can comprise the first terminal's account login information. In these embodiments, in the process of receiving the synchronization control request from the first terminal, the second terminal can verify whether the account logged in from the device on which the first terminal is installed entitles the first terminal to control the currently running multimedia application, and controls the currently running multimedia application in accordance with the one or more new playback attributes in the synchronization control request when and only when the verification result is positive.

An example verification process by a second terminal based on identification information can be as follows: when the synchronization control request comprises identification information of the first terminal or of the device on which the first terminal is installed, the second terminal receives the synchronization control request and, in accordance with the synchronization control request, verifies whether the identification information matches information stored on it or is within a whitelist configured for it. When and only when the result of the verification is positive, the second terminal controls the currently running multimedia application in accordance with the one or more new playback attributes in the synchronization control request.

An example verification process by a second terminal based on a first terminal's account login information can be as follows: when the synchronization control request comprises the first terminal's account login information, the second terminal receives the synchronization control request and, in accordance with the synchronization control request, verifies whether the account logged in from the device on which the first terminal is installed entitles the first terminal to control the currently running multimedia application. When and only when the verification result is positive, the second terminal controls the currently running multimedia application in accordance with the one or more new playback attributes in the synchronization control request.

There are various methods to set up accounts and various principles which the second terminal can employ to determine whether an account logged in from a device on which a first terminal is installed entitles the first terminal to control the currently running multimedia application. By way of examples only, when the account logged in from the device on which the first terminal is installed is the same as the account logged in from the device on which the second terminal is installed, the second terminal can determine that the first terminal has authority to control the currently running multimedia application. Or, when the account logged in from the device on which the first terminal is installed and the account logged in from the device on which the second terminal is installed belong to a same group account, the second terminal can determine that the first terminal has authority to control the currently running multimedia application. Or, when the account logged in from the device on which the first terminal is installed is an account within a specific whitelist configured for the server, the second terminal can determine that the first terminal has authority to control the currently running multimedia application. These principles and how to apply these principles to achieve account verification are well known to those skilled in the art.

Of course, the verification process does not have to be carried out during the process of receiving the synchronization control request by the second terminal. Instead, the first terminal and the second terminal can complete the verification process through prior negotiation. After the verification is completed, the first terminal or the second terminal can then start the synchronization process to achieve synchronized control. Methods of terminal-terminal negotiation and verification are well known to those skilled in the art.

According to some embodiments, the result of a verification process is not a complete denial or allowance of a synchronization control request. Instead, part of a synchronization control request may be allowed and part denied. For example, the first terminal is allowed to control certain but not all aspects of the currently running multimedia application or a multimedia file which the currently running multimedia application can play and/or manage. In these embodiments, the second terminal serves as a filter rather than a gate. This can be achieved by associating the identification information of the first terminal or the device on which the first terminal is installed, or the first terminal's login information, with different privileges/restrictions or different levels of privileges/restrictions. By way of example only, a particular first terminal identification, or a particular identification of the device on which a first terminal is installed, or a particular account logged in from the device on which the first terminal is installed, entitles the first terminal to control certain but not all aspects of the currently running multimedia application or a multimedia file which the currently running multimedia application can play and/or manage. In another example, only when the same account has been logged in from both the device on which the first terminal is installed and the device on which the second terminal is installed, will the first terminal be allowed to control all aspects of the currently running multimedia application or a multimedia file which the currently running multimedia application can play and/or manage, while the first terminal is allowed to control certain but not all aspects of the currently running multimedia application or a multimedia file which the currently running multimedia application can play and/or manage if the account logged in from the device on which the first terminal is installed is only within a same group account but different from the account logged in from the device on which the second terminal is installed, or if the account logged in from the device on which the first terminal is installed is only within a whitelist configured for the second terminal but different from the account logged in from the device on which the second terminal is installed. Methods of associating accounts with different privileges/restrictions or different levels of privileges/restrictions and the principles to apply a filter on the second terminal in accordance therewith are well known to those skilled in the art.

Figure 13:
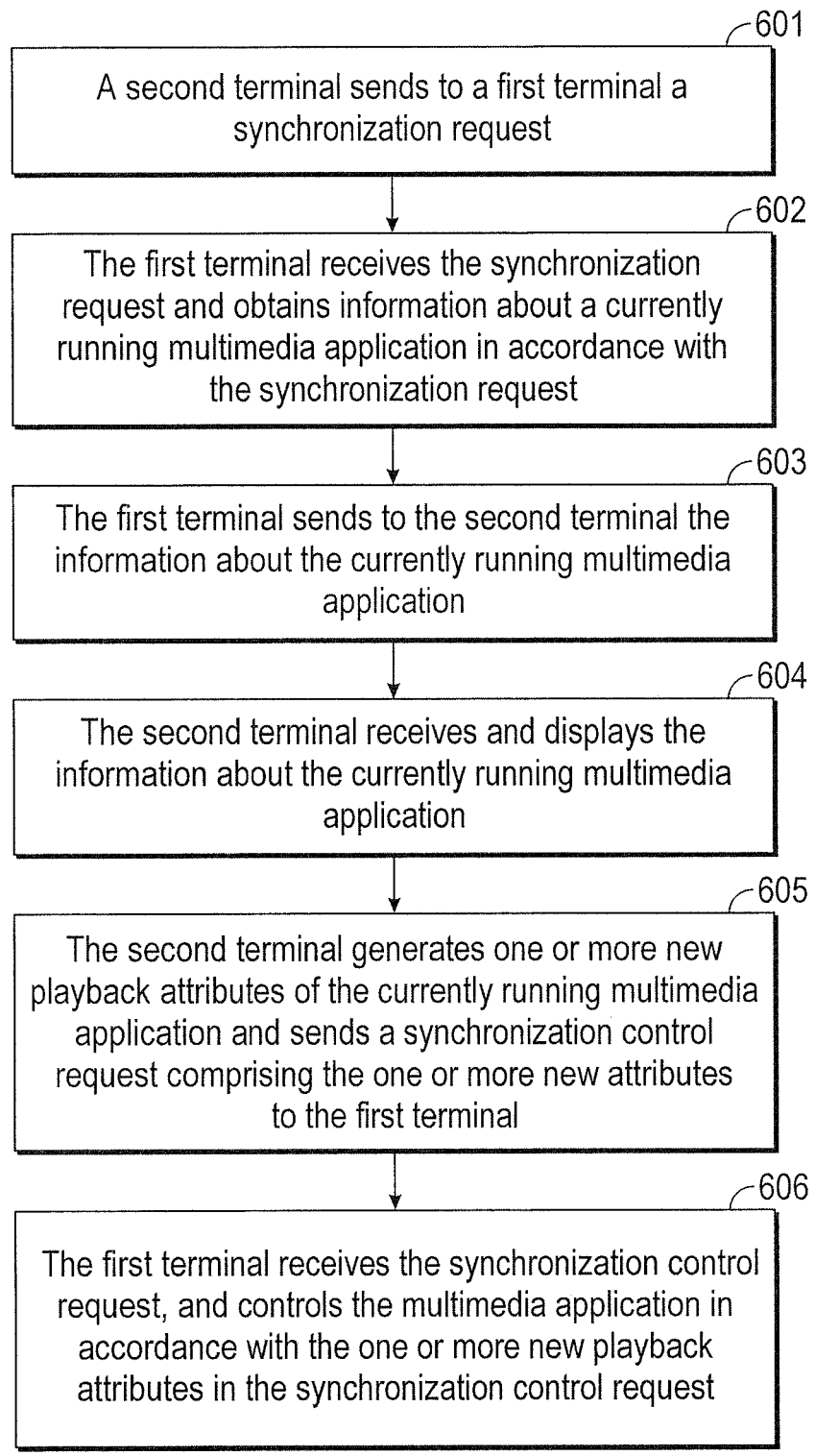
FIG. 13 is a flowchart illustrating an example of the flow of a terminal control method according to various embodiments.

The above process is described in terms of a first terminal controlling a multimedia application via a second terminal. According to some embodiments, reverse control is also possible, i.e., the second terminal can also synchronize control with the first terminal and control another multimedia application via the first terminal. FIG. 13 is a schematic diagram illustrating an example of the flow of a reverse terminal control method according to various embodiments. The method can comprise the following steps.

Step 601: a second terminal sends a synchronization request to a first terminal, the synchronization request configured to obtain information about a currently running multimedia application.

According to some embodiments, the currently running multimedia application the information about which the second terminal sends the synchronization request to obtain is the same as multimedia application in the process described above. According to some other embodiments, the currently running multimedia application the information about which the second terminal sends the synchronization request to obtain is different from the multimedia application in the process described above. According to some embodiments, the currently running multimedia application the information about which the second terminal sends the synchronization request to obtain and the second terminal are installed on a same device. According to some other embodiments, the currently running multimedia application the information about which the second terminal sends the synchronization request to obtain and the second terminal are installed on different devices. According to some embodiments, the currently running multimedia application the information about which the second terminal sends the synchronization request to obtain and the first terminal are installed on a same device. According to some other embodiments, the currently running multimedia application the information about which the second terminal sends the synchronization request to obtain and the first terminal are installed on different devices. According to some embodiments, the currently running multimedia application the information about which the second terminal sends the synchronization request to obtain is the first terminal.

Step 602: the first terminal receives the synchronization request and obtains the information about the currently running multimedia application in accordance with the synchronization request. Similar to step 502 described above, this step can additionally comprise a verification process, which has been described in detail hereinabove.

Step 603: the first terminal sends to the second terminal the information about the currently running multimedia application.

Step 604: the second terminal receives and displays the information about the currently running multimedia application.

Step 605: the second terminal, based on one or more user commands, generates one or more new playback attributes of the currently running multimedia application, and sends to the first terminal a synchronization control request comprising the one or more new playback attributes.

Step 606: the first terminal receives the synchronization control request and, in accordance with the one or more new playback attributes in the synchronization control request, controls the multimedia application. Similar to step 506 described above, this step can additionally comprise a verification process, which has been described in detail hereinabove.

A method of terminal control does not need to include all the steps in the process described above. As long as the first terminal (or the second terminal, as the case may be) has obtained the information about the currently running multimedia application, or the second terminal (or the first terminal, as the case may be) has sent the information about the currently running multimedia application generated by it, a method of terminal control may be considered completed. According to some embodiments, a method of terminal control is completed when the first terminal (or the second terminal, as the case may be) displays the information about the currently running multimedia application, i.e., no user command is necessary and no new playback attribute of the currently running multimedia application is generated. Accordingly, no synchronization control request is sent and the running of the multimedia application is not changed or interrupted. By way of example only, when a first terminal (or a second terminal, as the case may be) displays the lyrics of a song currently being played by a multimedia player, the first terminal (or the second terminal, as the case may be) is considered to have controlled the playback of the song by the multimedia player. Similarly, when a first terminal (or a second terminal, as the case may be) displays the subtitle of a movie currently being played by a multimedia player, the first terminal (or the second terminal, as the case may be) is considered to have controlled the playback of the movie by the multimedia player. Sometimes, a user may only want to know what is being played by a multimedia player, or the multimedia player's playback history, and as long as that information is displayed by the first terminal (or the second terminal, as the case may be), the user is considered to have controlled the playback of the multimedia player, without inputting any further user command.

According to some embodiments, the information displayed by the first terminal (or the second terminal, as the case may be) is also displayed in real-time by the multimedia player. By way of example only, a first terminal (or a second terminal, as the case may be) may display the lyrics of a song (or the subtitles of a movie) when the same lyrics (or subtitles) are also being displayed, in real-time, by the currently running multimedia application, e.g., via a display device connected to the device on which the multimedia player is installed. According to some other embodiments, the information displayed by the first terminal (or the second terminal, as the case may be) is not displayed by the multimedia player. By way of example only, a first terminal (or a second terminal, as the case may be) may display the lyrics of a song (or the subtitles of a movie) when the currently running multimedia application does not display the lyrics (or the subtitles). Display of certain information about a currently running multimedia application by the first terminal (or the second terminal, as the case may be) only and not by the currently running multimedia application can be desirable in various situations. By way of example only, a user may find the display of the information by the currently running multimedia application interferes with her viewing experience (e.g., she only wants to know the title of a movie being played or to control the playback of the movie without having the title or any control button displayed on the movie screen and distract her from viewing the movie). Also by way of example only, a user may want to monitor the playback of a currently running multimedia application remotely without having the viewer of the content being played notice such monitoring, where the user herself is not the viewer.

The above describes methods of terminal control in example embodiments from the perspectives of both the controlling side and the controlled side. Some of the example embodiments below describe the methods from the perspective of only one side.

Figures 14, 15:
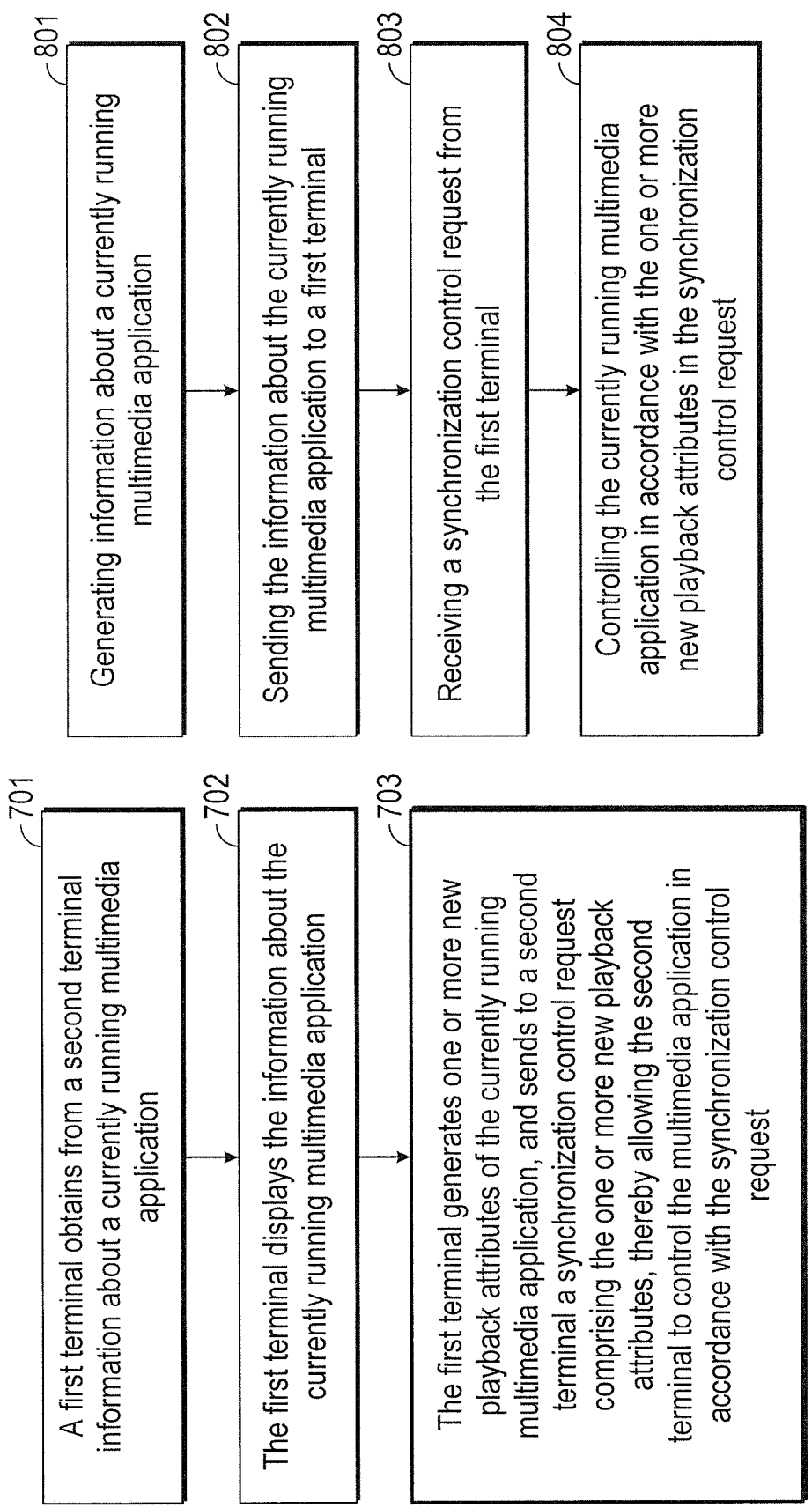
FIG. 14 is a flowchart illustrating an example of the flow of a terminal control method at the controlling side according to various embodiments.
FIG. 15 is a flowchart illustrating an example of the flow of a terminal control method at the controlled side according to various embodiments.

FIG. 14 is a schematic diagram illustrating an example of the flow of a terminal control method at the controlling side according to various embodiments. The method comprises the following steps.

Step 701: a first terminal obtains from a second terminal information about a currently running multimedia application, the information comprising application identification of the multimedia application and one or more playback attributes of the multimedia application. The multimedia application can comprise a media player. The playback attributes can comprise the current playback volume, the item currently being played, the current playback time of the item being played, and one or more items in a playlist.

Prior to step 701, the first terminal may send a synchronization request to the second terminal, the synchronization request configured to obtain the information about the currently running multimedia application. According to some embodiments, the synchronization request can comprise the first terminal's account login information. According to some other embodiments, the synchronization request can comprise identification information of the first terminal or of the device on which the first terminal is installed.

According to some embodiments where the first terminal sends a synchronization request to the second terminal, it is desirable to use a verification process to determine authority of the first terminal to obtain the information before successful synchronization of information about the multimedia application with the first terminal and the successful control of the multimedia application by the first terminal can be achieved. There are various methods to set up accounts and their relationships, and various principles to determine whether the account logged in from the device on which the first terminal is installed entitles the first terminal to obtain the information. Some of these methods and principles have been described in detail hereinabove. For example, if the verification criterion is that a same account has been logged in from both the device on which the first terminal is installed and the device on which a second terminal is installed, then prior to step 701, there can also be an additional step of logging in a first account from the device on which the first terminal is installed, wherein the first account is also the account logged in from the device on which the second terminal is installed. Other verification methods and criteria, including those described above (e.g., by using identification information of the first terminal or of the device on which the first terminal is installed, or by using a group account or a whitelist) are well known to those skilled in the art.

Step 702: the first terminal displays the information about the currently running multimedia application.

Step 703: the first terminal, based on one or more user commands, generates one or more new playback attributes of the currently running multimedia application, and sends to the second terminal a synchronization control request comprising the one or more new playback attributes, thereby allowing the second terminal, in accordance with the one or more new playback attributes in the synchronization control request, to control the multimedia application.

According to some embodiments, the synchronization process need not be initiated by the first terminal, i.e., the first terminal need not send a request to obtain the information first. Instead, the information can be sent to the first terminal from the second terminal in the absence of any request from the first terminal. This is desirable in situations where a user would like to use the first terminal to not only control the multimedia application but also to monitor the running of the multimedia application, either periodically or when one or more of its playback attributes have changed. By way of example only, a second terminal can send information about a currently running multimedia application to a first terminal from time to time at either predetermined or customizable intervals. Upon receipt of the information, the first terminal can display the information thereby allowing a user to control the multimedia application.

FIG. 15 is a schematic diagram illustrating an example of the flow of a terminal control method at the controlled side according to various embodiments. The method comprises the following steps.

Step 801: generating information about a currently running multimedia application, the information comprising the application identification of the multimedia application and one or more playback attributes of the multimedia application. The playback attributes can comprise the current playback volume, the item currently being played, the current playback time of the item being played, and one or more items in a playlist.

Step 802: sending the information about the currently running multimedia application to a first terminal, thereby allowing the first terminal to generate and return one or more new playback attributes of the currently running multimedia application. According to some embodiments, the generated one or more new playback attributes were generated in accordance with one or more user commands.

Step 803: receiving a synchronization control request sent from the first terminal, wherein the synchronization control request comprises the one or more new playback attributes of the currently running multimedia application.

Step 804: controlling the currently running multimedia application in accordance with the one or more new playback attributes in the synchronization control request.

According to some embodiments, generating the information about the currently running multimedia application is in response to a synchronization request from the first terminal to obtain the information. In these embodiments, accordingly, the method should further comprise the following step prior to generating the information about the currently running multimedia application: receiving from the first terminal a synchronization request to obtain the information about the currently running multimedia application, wherein generating the information about the currently running multimedia application is in accordance with the synchronization request.

According to some other embodiments, generating the information about the currently running multimedia application is not in response to any synchronization request, but can happen from time to time at either pre-determined or customizable intervals. This is desirable when frequent or periodic monitoring of the running of the multimedia application is intended, because it obviates the need for frequent or periodic synchronization requests.

According to some embodiments, a first terminal can obtain relevant information about a multimedia application currently running on a device on which a second terminal is installed and display the information on the first terminal, thereby allowing a user to observe the multimedia application running status on the device on which the second terminal is installed from the first terminal. Compared to existing TV remote controls, the remote control that can be achieved using the first terminal can have much richer control functionalities.

According to some embodiments, a first terminal can generate a control command corresponding to information obtained from a second terminal, and send a request to the second terminal, thereby controlling the running of a multimedia application installed on the device on which the second terminal is installed. The connection between the first terminal and the second terminal can be via a local area network, such as a WiFi network, or any other method connecting a terminal to another terminal, such as Bluetooth, infrared, or near field communication. These methods are well known to those skilled in the art. Regardless of the method of connection, the present disclosure achieves the control of a multimedia application via a terminal installed on a different device, i.e., the control of one device's multimedia application can be transferred to another device. Different choices of the controlling device on which the first terminal can be installed result in the convenience and flexibility of remotely controlling the multimedia application.

For example, according to some embodiments, when the first terminal is installed on a mobile terminal device (e.g., a mobile phone or a tablet PC), and the second terminal is installed on a terminal device with multimedia playback functions (e.g., a desktop computer or a smart TV), because of the mobility of the mobile terminal device and the visibility of the application information on it, users can conveniently enjoy the versatility of different methods of control, as long as the network environment allows it. As mobile terminal devices are being smarter and smarter nowadays, it has become very easy to configure a client-side application to achieve the remote control according to the present disclosure, without the need to modify any hardware (e.g., to program a TV remote control), or to significantly increase the client part of a mobile terminal device, in order to achieve rich remote control functionalities.

According to some embodiments, the control between a first terminal and a second terminal can be reciprocal, i.e. the first terminal can control a multimedia application via the second terminal, and the second terminal can also control another, or the same, multimedia application via the first terminal. In some embodiments, a multimedia application and a terminal via which another terminal remotely controls the multimedia application are installed on a same device. In some other embodiments, the multimedia application and the terminal via which another terminal remotely controls the multimedia application are installed on separate devices.

Figure 16:
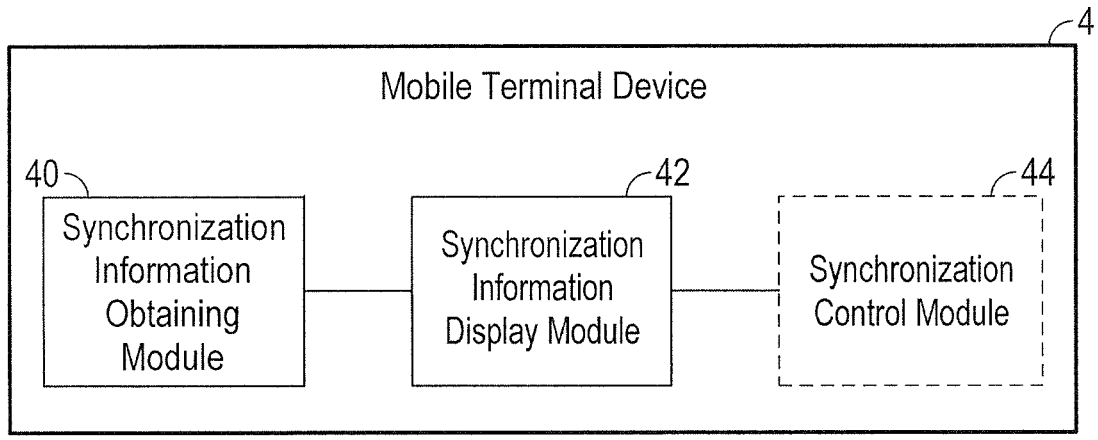
FIG. 16 is a system diagram illustrating examples of arrangements of a mobile terminal device according to various embodiments.

FIG. 16 is a system diagram illustrating examples of arrangements of a mobile terminal device according to various embodiments. Examples of the mobile terminal device include, but are not limited to, a smart phone and a tablet PC. The mobile terminal device 4 comprises: a synchronization information obtaining module 40, configured to request and obtain from a second terminal information about a currently running multimedia application, the information comprising application identification of the multimedia application and one or more playback attributes of the multimedia application; and a synchronization information display module 42, configured to display the information about the currently running multimedia application. Optionally, the mobile terminal device additionally comprises a synchronization control module 44, configured to generate one or more new playback attributes of the currently running multimedia application in accordance with one or more user commands, and to send a synchronization control request comprising the one or more new playback attributes to the second terminal, thereby allowing the second terminal to control the currently running multimedia application in accordance with the one or more new playback attributes in the synchronization control request. The multimedia application can comprise a media player. The playback attributes can comprise the current playback volume, the item currently being played, the current playback time of the item being played, and one or more items in a playlist.

The mobile terminal device can additionally comprise a login module configured to log in a corresponding account. When the mobile terminal device sends a request to a second terminal to synchronize the information about a currently running multimedia application, the request can carry the account login information, whereby the second terminal can verify, based on the account login information, whether the mobile terminal device has authority to synchronize the information about the currently running multimedia application.

The terminal device as described above does not have to be a mobile terminal device. According to some embodiments, the second terminal and the currently running multimedia application are installed on a same device. According to some other embodiments, the second terminal and the currently running multimedia application are installed on different devices. According to some embodiments, the second terminal is the currently running multimedia application.

The synchronization request can additionally comprise the first terminal's account login information or identification information of the first terminal or the device on which the first terminal is installed.

Figure 17:
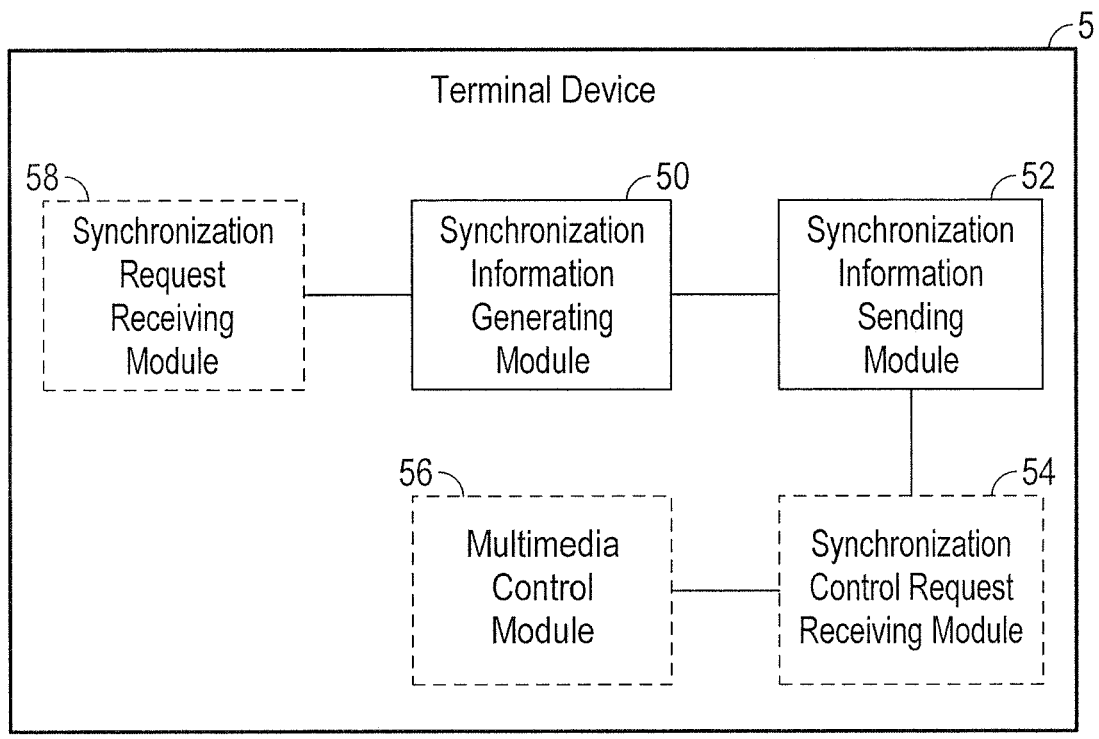
FIG. 17 is a system diagram illustrating examples of arrangements of a terminal device according to various embodiments.

FIG. 17 is a system diagram illustrating examples of arrangements of a terminal device according to various embodiments. The terminal device 5 comprises: a synchronization information generating module 50, configured to generate information about a currently running multimedia application, the information comprising application identification of the multimedia application and one or more playback attributes of the multimedia application; and a synchronization information sending module 52, configured to send the information to another terminal. Optionally, the terminal device can further comprise: a synchronization request receiving module 58, configured to receive from the other terminal a synchronization request to obtain the information. According to these embodiments, the synchronization information generating module 50 is configured to generate the information about the currently running multimedia application in accordance with the synchronization request. Optionally, in addition to synchronization information generating module 50 and synchronization information sending module 52, the terminal device comprises: a synchronization control request receiving module 54, configured to receive from the other terminal a synchronization control request comprising one or more new playback attributes of the currently running multimedia application; and a multimedia control module 56, configured to control the multimedia application in accordance with the one or more new playback attributes in the synchronization control request. Optionally, in addition to synchronization information generating module 50 and synchronization information sending module 52, the terminal device comprises: a synchronization request receiving module 58, configured to receive from the other terminal a synchronization request to obtain the information; a synchronization control request receiving module 54, configured to receive from the other terminal a synchronization control request comprising one or more new playback attributes of the currently running multimedia application; and a multimedia control module 56, configured to control the multimedia application in accordance with the one or more new playback attributes in the synchronization control request. According to these embodiments, the synchronization information generating module 50 is configured to generate the information about the currently running multimedia application in accordance with the synchronization request. The multimedia application can comprise a media player. According to some embodiments, the playback attributes can comprise the current playback volume, the item currently being played, the current playback time of the item being played, and one or more items in a playlist. Accordingly, the multimedia control module 56 can be configured to control a media player to adjust current playback volume, change the item currently being played, change the current playback time of the item being played, and select one or more items in a playlist.

According to some embodiments, the terminal and the currently running multimedia application are installed on a same device. According to some other embodiments, the terminal and the currently running multimedia application are installed on different devices. According to some embodiments, the terminal is the currently running multimedia application.

According to some embodiments, the synchronization request can additionally comprise the first terminal's account login information or identification information of the first terminal or the device on which the first terminal is installed. Accordingly, the terminal device can further comprise a synchronization request verification module, configured to verify, in accordance with the synchronization request, whether the other terminal has authority to obtain the information about the currently running multimedia application. When and only when the result of the verification is positive, will the terminal device generate the information about the currently running multimedia application, or send the generated information to the other terminal. The multimedia application can comprise a media player. The playback attributes can comprise the current playback volume, the item currently being played, the current playback time of the item being played, and one or more items in a playlist.

According to some embodiments, the synchronization control request can additionally comprise the first terminal's account login information or identification information of the first terminal or the device on which the other terminal is installed. Accordingly, the terminal device can further comprise: a synchronization control request verification module, configured to verify, in accordance with the synchronization control request, whether the other terminal has authority to control the currently running multimedia application. When and only when the result of the verification is positive, the multimedia control module is started and controls the currently running multimedia application in accordance with the one or more new playback attributes in the synchronization control request. The multimedia application can comprise a media player. The playback attributes can comprise the current playback volume, the item currently being played, the current playback time of the item being played, and one or more items in a playlist.

According to some embodiments, a terminal device can comprise both a synchronization request verification module, configured to verify, in accordance with the synchronization request, whether the other terminal has authority to obtain the information about the currently running multimedia application, and a synchronization control request verification module, configured to verify, in accordance with the synchronization control request, whether the other terminal has authority to control the currently running multimedia application. Even if the same information from the other terminal for verification, e.g., the other terminal's account login information or identification information of the other terminal or the device on which the other terminal is installed, is present in both the synchronization request and the synchronization control request, the results of the verification by the synchronization request verification module and the synchronization control request verification module can be different. That is, the synchronization request verification module and the synchronization control request verification module can apply different standards and grant different privileges or impose different restrictions in their respective verification processes. By way of examples only, a device identification of the device on which the other terminal is installed can entitle the other terminal to only obtain and display the information about a currently running multimedia application and not to control the multimedia application. Or, an account logged in from the device on which the other terminal is installed can entitle the other terminal to obtain and display all the information about a currently running multimedia application but to control only a subset and not all the aspects of the multimedia application or a file which the multimedia application can play and/or manage.

According to some embodiments, both the synchronization request verification module and the synchronization control request verification module serve as gates, in that they can only grant or deny authority to the other terminal in toto. According to some other embodiments, both the synchronization request verification module and the synchronization control request verification module serve as filters, in that they can each grant or deny partial authority to the other terminal, e.g., by allowing some part but not other parts of a synchronization request, or by allowing some part but not other parts of a synchronization control request. According to yet some other embodiments, the synchronization request verification module is a gate and the synchronization control request verification module is a filter. According to still some other embodiments, the synchronization request verification module is a filter and the synchronization control request verification module is a gate.

The terms and functions referred to when describing the above terminal devices have their same respective meanings as discussed hereinabove. Those skilled in the art will readily appreciate that the terminal device can be either a mobile terminal device or a non-mobile terminal device. For example, according to some embodiments, a mobile terminal device can control another mobile terminal device. In some other embodiments, a non-mobile terminal device can control another non-mobile terminal device. In yet some other embodiments, a mobile terminal device can control a non-mobile terminal device. In still some other embodiments, a non-mobile terminal device can control a mobile terminal device.

Figure 18B:
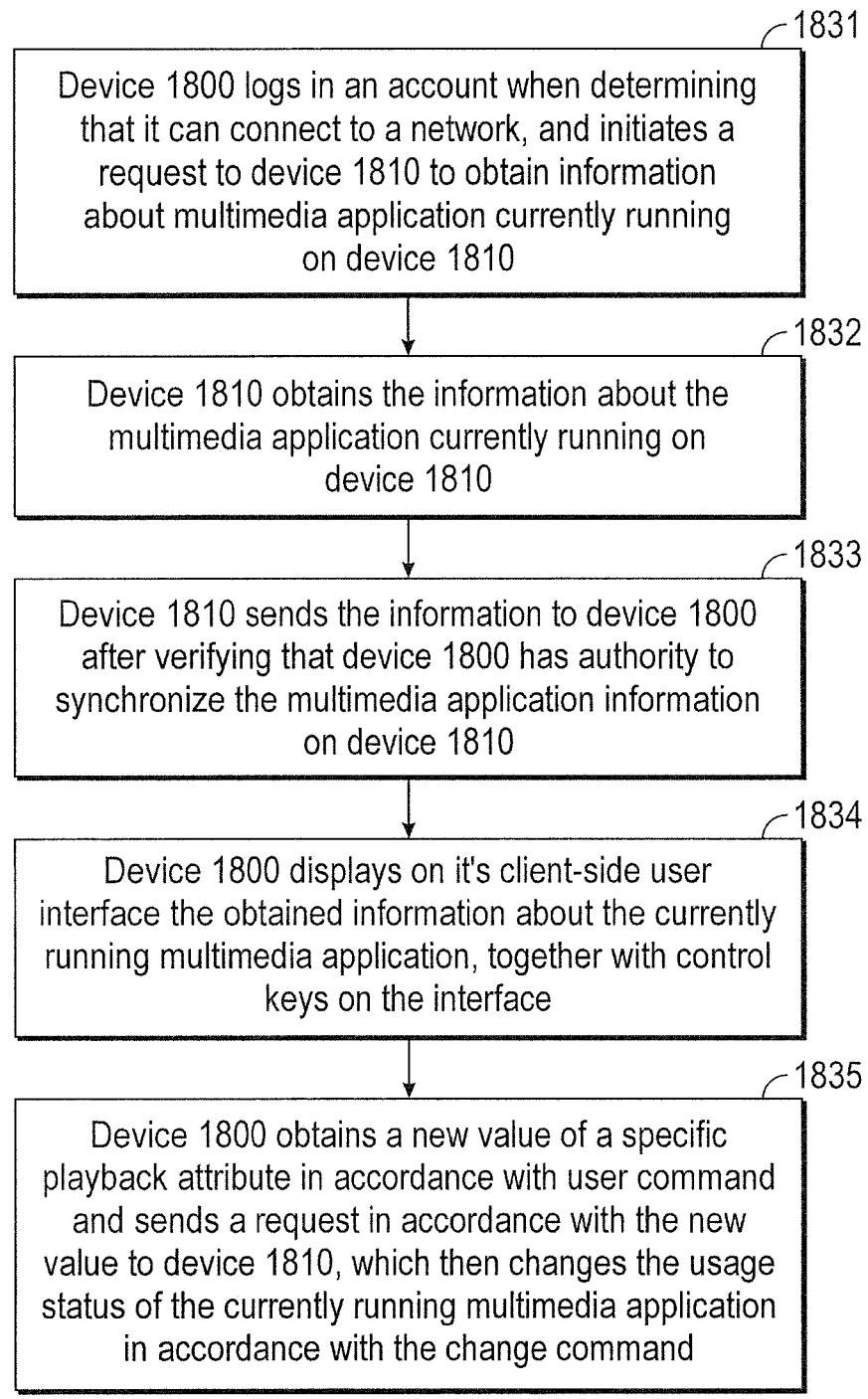
FIG. 18B is a flowchart illustrating an example of the flow of processes each of the terminals executes according to various embodiments.

FIG. 18A is a system diagram illustrating an example system according to various embodiments. As illustrated in FIG. 18A, devices 1800 and 1810 can be connected to each other e.g., in a local area network, such as in a WiFi network, or are directly connected to each other via such connections as Bluetooth, infrared, or near field communication. FIG. 18B is a flowchart illustrating an example of the flow of processes each of the terminals in FIG. 18A executes according to various embodiments.

In this particular example, the embodiment of the device on which the first terminal is installed (device 1800) is a mobile terminal device, and the embodiment of the device on which the second terminal is installed (device 1810) is a PC.

According to these particular embodiments, both device 1100 and device 1110 have account login function.

As illustrated in FIG. 18B, the process is as follows:

Step 1831: a user turns on device 1800, which logs in an account when determining that it can connect to the network, and initiates a request to device 1810 to obtain information about multimedia application currently running on device 1810.

Step 1832: after receiving the request, device 1810 obtains the information about the multimedia software currently in use, including name of the software and properties of software usage. By way of example only, in the case of a music playing application, such properties of software usage can comprise playlist of songs, title of the song currently being played, current volume and playback status, etc.

Step 1833: device 1810 then returns the information to device 1800. In this particular embodiment, in the synchronization process, device 1810 verifies whether device 1800 has authority to synchronize the multimedia application information on device 1810. Methods of such verification have been described in detail hereinabove and are well known to those skilled in the art. For example, device 1810 can verify whether device 1800 and device 1810 have logged into a same account and, if so, determine that device 1800 has authority to synchronize the multimedia application information on device 1810 and proceed with the synchronization. The specific verification principle can be configured on device 1810 based on the actual need and methods of such configuration are well known to those skilled in the art.

Step 1834: device 1800 displays on its client-side user interface the obtained information about the currently running multimedia application, together with control keys on the interface. As shown in FIG. 3 (which illustrates an example of synchronizing music playback information between a first terminal and a second terminal according to various embodiments), a mobile phone displays on its user interface a music playlist on a computer, and a user of the mobile phone can quickly switch between songs and control the playback, pause, volume, and progress of the music on the computer via buttons on the interface. As shown in FIG. 4 (which illustrates an example of synchronizing video playback information between a first terminal and a second terminal according to various embodiments), a mobile phone displays on its user interface a movie playlist on a computer, and a user of the mobile phone can quickly switch between movies and control the playback, pause, volume, and progress of the movie on the computer via buttons on the interface.

Step 1835: when the user triggers a specific control command by, e.g., pressing a specific key on device 1800, device 1800 obtains the corresponding user command and obtains a new value of a specific playback attribute in accordance with the user command. For example, if the user command is to switch to a new music item, then device 1800 can generate a status bit for the attribute and a changed attribute value group package and sends a request to device 1810, which then changes the usage status of the currently running multimedia application in accordance with the change command, thereby accomplishing the control by the mobile terminal device.

According to some embodiments, a user can switch audio and/or video programs on a remote terminal device at any time as she wishes via a mobile phone terminal device. The increased flexibility in controlling the playback of audio and video greatly enhances user experience.

Persons of ordinary skill in the art can readily appreciate that all or part of the steps of the methods described in the embodiments above can be executed by relevant hardware instructed by a program that may be stored in a computer-readable memory medium. The readable memory medium may be, for example, a read-only memory ("ROM"), a random access memory ("RAM"), a magnetic disk or a compact disc.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

What is claimed is:

1. A terminal control method, comprising:
sending, by a first terminal, a status request to a server requesting the server to obtain information about a multimedia application currently running on a second terminal, the information comprising application identification and one or more first playback attributes of the multimedia application;
receiving and displaying, by the first terminal, the information about the multimedia application sent by the server in response to the status request;
receiving, by the first terminal, one or more user commands;
generating, by the first terminal, one or more second playback attributes for the multimedia application in accordance with the one or more user commands,
sending, by the first terminal, a control request to the server requesting the server to control the multimedia application currently running on the second terminal, the control request comprising the one or more second playback attributes for the multimedia application;
receiving, by the second terminal, the control request from the server and controlling the multimedia application to play a multimedia file in accordance with the one or more second playback attributes in the control request;

determining that one of the one or more second playback attributes generated by the first terminal and received from the server is a comment on the multimedia file;

forwarding the multimedia file, by the server, to the second terminal; and posting, by the second terminal, after the comment of the multimedia file is forwarded by the server to the second terminal, the comment of the multimedia file to a corresponding website upon receiving the control request in response to determining that one of the one or more second playback attributes is the comment on the multimedia file.

2. The method according to claim 1, further comprising:

before sending the status request, sending, by the first terminal, login information to the server;

wherein:

the server responds to the status request after the login information is verified by the server that the first terminal has authority to obtain the information in accordance with the status request; and the server responds to the control request after the login information is verified by the server that the first terminal has authority to control the multimedia application in accordance with the control request.

3. The method according to claim 1, wherein the method further comprises:

recording an original playback attribute of the multimedia application before receiving the one or more second playback attributes in the control request;

determining that the original playback attribute of the multimedia application includes the multimedia file being stored online and one of the one or more second playback attributes is the multimedia file being stored locally; and initiating, by the second terminal, downloading of the multimedia file and storing the multimedia file locally upon receiving the control request in response to determining that the original playback attribute of the multimedia application is the multimedia file being stored online and one of the one or more second playback attributes is the multimedia file being stored locally.

4. The method according to claim 1, wherein the method further comprises:

recording an original playback attribute of the multimedia application before receiving the one or more second playback attributes in the control request;

determining that the original playback attribute of the multimedia application includes an existing comment on the multimedia file and one of the one or more second playback attributes is a new comment on the multimedia file, and posting the new comment of the multimedia file to a corresponding website upon receiving the control request in response to determining that the original playback attribute of the multimedia application includes an existing comment on the multimedia file and one of the one or more second playback attributes is the new comment on the multimedia file.

5. The method according to claim 1, wherein the multimedia file comprises at least video data.

6. A terminal control method, comprising:

receiving, by a server, a status request from a first terminal, the status request being configured to obtain information about a multimedia application currently running on a second terminal;

requesting, by the server, the information from the second terminal in accordance with the status request, the information comprising application identification and one or more first playback attributes of the multimedia application;

sending, by the server, the information requested from the second terminal to the first terminal;

after sending the information to the first terminal, receiving a control request from the first terminal, the control request comprising one or more second playback attributes for the multimedia application;

sending, by the server, the control request to the second terminal;

receiving, by the second terminal, the control request from the server and controlling the multimedia application to play a multimedia file in accordance with the one or more second playback attributes in the control request;

determining that one of the one or more second playback attributes generated by the first terminal and received from the server is a comment on the multimedia file;

forwarding the multimedia file, by the server, to the second terminal; and posting, by the second terminal, after the comment of the multimedia file is forwarded by the server to the second terminal, the comment of the multimedia file to a corresponding website upon receiving the control request in response to determining that one of the one or more second playback attributes is the comment on the multimedia file.

7. The method according to claim 6, further comprising:

receiving, by the server, a first account login information from a first terminal;

receiving, by the server, a second account login information from a second terminal;

verifying, by the server, whether the first terminal has authority to obtain the information based on the first login information and the second login information, wherein the server responds to the status request in response to verifying that the first terminal has authority to obtain the information in accordance with the status request; and verifying, by the server, whether the first terminal has authority to obtain the information based on the first login information and the second login information, wherein the server responds to the control request in response to verifying that the first terminal has authority to control the multimedia application in accordance with the control request.

8. The method according to claim 6, wherein the method further comprises:

recording an original playback attribute of the multimedia application before receiving the one or more second playback attributes in the control request;

determining that the original playback attribute of the multimedia application includes an existing comment on the multimedia file and one of the one or more second playback attributes is a new comment on the multimedia file, and posting the new comment of the multimedia file to a corresponding website upon receiving the control request in response to determining that the original playback attribute of the multimedia application includes an existing comment on the multimedia file and one of the one or more second playback attributes is the new comment on the multimedia file.

9. The method according to claim 6, wherein the method further comprises:

recording an original playback attribute of the multimedia application before receiving the one or more second playback attributes in the control request;

determining that the original playback attribute of the multimedia application includes a right to play the multimedia file being unpaid and one of the one or more second playback attributes is a right to play the second multimedia file being paid; and purchasing the right to play of the multimedia file upon receiving the control request in response to both a first determination and a second determination are satisfied, the first determination being determining that the original playback attribute of the multimedia application on the second terminal is the right to play the multimedia file being unpaid before receiving the control request and the second determination being determining that one of the one or more second playback attributes generated by the first terminal and forwarded by the server is the right to play the multimedia file being paid in accordance with the control request.

10. The method according to claim 6, wherein the multimedia file comprises at least video data.

11. A terminal control system, comprising:
a first terminal comprising:
  a first memory;
  a first processor coupled to the first memory, the first processor being configured for:
    sending a status request to a server requesting the server to obtain information about a multimedia application currently running on a second terminal, the information comprising application identification and one or more first playback attributes of the multimedia application;
    receiving and displaying the information about the multimedia application sent by the server in response to the status request;
    receiving one or more user commands;
    generating one or more second playback attributes for the multimedia application in accordance with the one or more user commands;
    sending a control request to the server requesting the server to control the multimedia application currently running on the second terminal, the control request comprising the one or more second playback attributes for the multimedia application;
a second terminal comprising:
  a second memory;
  a second processor coupled to the second memory, the second processor being configured for:
    receiving the control request from the server;
    controlling the multimedia application to play a multimedia file in accordance with the one or more second playback attributes in the control request;
    determining that one of the one or more second playback attributes generated by the first terminal and received from the server is a comment on the multimedia file;
    forwarding the multimedia file, by the server, to the second terminal; and
    posting, after the comment of the multimedia file is forwarded by the server to the second terminal, the comment of the multimedia file to a corresponding website upon receiving the control request in response to determining that one of the one or more second playback attributes is the comment on the multimedia file.

12. The system according to claim 11, wherein the first processor is further configured for: before sending the status request, sending login information to the server;
wherein:
  the server responds to the status request after the login information is verified by the server that the first terminal has authority to obtain the information in accordance with the status request; and
  the server responds to the control request after the login information is verified by the server that the first terminal has authority to control the multimedia application in accordance with the control request.

13. The system according to claim 11, wherein the second processor is further configured for:
  recording an original playback attribute of the multimedia application before receiving the one or more second playback attributes in the control request;
  determining that the original playback attribute of the multimedia application includes the multimedia file being stored online and one of the one or more second playback attributes is the multimedia file being stored locally; and
  initiating, by the second terminal, downloading of the multimedia file and storing the multimedia file locally upon receiving the control request in response to determining that the original playback attribute of the multimedia application is the multimedia file being stored online and one of the one or more second playback attributes is the multimedia file being stored locally.

14. The system according to claim 11, wherein the second processor is further configured for:
  recording an original playback attribute of the multimedia application before receiving the one or more second playback attributes in the control request;
  determining that the original playback attribute of the multimedia application includes a right to play the multimedia file being unpaid and one of the one or more second playback attributes is a right to play the second multimedia file being paid; and
  purchasing the right to play of the multimedia file upon receiving the control request in response to both a first determination and a second determination are satisfied, the first determination being determining that the original playback attribute of the multimedia application on the second terminal is the right to play the multimedia file being unpaid and the second determination being determining that one of the one or more second playback attributes generated by the first terminal and forwarded by the server is the right to play the multimedia file being paid.

15. The system according to claim 11, wherein the multimedia file comprises at least video data.

16. A network server, comprising:
  a memory;
  a processor coupled to the memory, the processor being configured for:
    receiving a status request from a first terminal, the status request being configured to obtain information about a multimedia application currently running on a second terminal;
    requesting the information from the second terminal in accordance with the status request, the information comprising application identification and one or more first playback attributes of the multimedia application;
    sending the information requested from the second terminal to the first terminal;

after sending the information to the first terminal, receiving a control request from the first terminal, the control request comprising one or more second playback attributes for the multimedia application;

sending the control request to the second terminal, wherein the second terminal receives the control request and controls the multimedia application in accordance with the one or more second playback attributes in the control request;

determining that one of the one or more second playback attributes generated by the first terminal and received from the server is a comment on the multimedia file;

forwarding the multimedia file, by the server, to the second terminal; and requesting the second terminal to post, after the comment of the multimedia file is forwarded by the server to the second terminal, the comment of the multimedia file to a corresponding website upon receiving the control request in response to determining that one of the one or more second playback attributes is the comment on the multimedia file.

17. The server according to claim 16, wherein the processor is further configured for:

receiving a first account login information from a first terminal;

receiving a second account login information from a second terminal;

verifying whether the first terminal has authority to obtain the information based on the first login information and the second login information, wherein the server responds to the status request in response to verifying that the first terminal has authority to obtain the information in accordance with the status request; and verifying whether the first terminal has authority to obtain the information based on the first login information and the second login information, wherein the server responds to the control request in response to verifying that the first terminal has authority to control the multimedia application in accordance with the control request.

18. The server according to claim 16, wherein the processor is further configured for:

recording an original playback attribute of the multimedia application before receiving the one or more second playback attributes in the control request;

determining that the original playback attribute of the multimedia application includes an existing comment on the multimedia file and one of the one or more second playback attributes is a new comment on the multimedia file; and posting the new comment of the multimedia file to a corresponding website upon receiving the control request in response to determining that the original playback attribute of the multimedia application includes an existing comment on the multimedia file and one of the one or more second playback attributes is the new comment on the multimedia file.

19. The server according to claim 16, wherein the processor is further configured for:

recording an original playback attribute of the multimedia application before receiving the one or more second playback attributes in the control request;

determining that the original playback attribute of the multimedia application includes a right to play the multimedia file being unpaid and one of the one or more second playback attributes is a right to play the second multimedia file being paid; and purchasing the right to play of the multimedia file upon receiving the control request in response to both a first determination and a second determination are satisfied, the first determination being determining that the original playback attribute of the multimedia application on the second terminal is the right to play the multimedia file being unpaid before receiving the control request and the second determination being determining that one of the one or more second playback attributes generated by the first terminal and forwarded by the server is the right to play the multimedia file being paid in accordance with the control request.

20. The server according to claim 16, wherein the multimedia file comprises at least video data.

* * * * *